(12) United States Patent
Naskar et al.

(10) Patent No.: US 11,124,652 B2
(45) Date of Patent: Sep. 21, 2021

(54) SHAPE MEMORY POLYMER BLEND MATERIALS

(71) Applicant: UT-Battelle, LLC, Oak Ridge, TN (US)

(72) Inventors: Amit K. Naskar, Knoxville, TN (US); Ngoc Anh Nguyen, Oak Ridge, TN (US)

(73) Assignee: UT-Battelle, LLC, Oak Ridge, TN (US)

(*) Notice: Subject to any disclaimer, the term of this patent is extended or adjusted under 35 U.S.C. 154(b) by 269 days.

(21) Appl. No.: 16/014,136

(22) Filed: Jun. 21, 2018

(65) Prior Publication Data

US 2018/0371253 A1 Dec. 27, 2018

Related U.S. Application Data

(60) Provisional application No. 62/522,754, filed on Jun. 21, 2017.

(51) Int. Cl.
| | | |
|---|---|---|
| C08L 9/02 | (2006.01) | |
| C08L 97/00 | (2006.01) | |
| B29C 61/00 | (2006.01) | |
| B29C 61/02 | (2006.01) | |
| B29K 55/00 | (2006.01) | |
| B29K 55/02 | (2006.01) | |

(52) U.S. Cl.
CPC .......... *C08L 97/005* (2013.01); *B29C 61/003* (2013.01); *B29C 61/02* (2013.01); *C08L 9/02* (2013.01); *B29K 2055/00* (2013.01); *B29K 2055/02* (2013.01); *C08L 2201/12* (2013.01)

(58) Field of Classification Search
None
See application file for complete search history.

(56) References Cited

U.S. PATENT DOCUMENTS

| | | |
|---|---|---|
| 2,341,553 A | 2/1944 | Houtz |
| 2,608,537 A | 8/1952 | Pollak |
| 2,635,976 A | 4/1953 | Meiler et al. |
| 2,911,383 A | 11/1959 | Doughty |
| 3,167,523 A | 7/1965 | Dimitri |
| 3,230,201 A | 1/1966 | Hart et al. |
| 3,892,720 A | 7/1975 | Jahnke |
| 4,260,702 A | 4/1981 | Schultz et al. |
| 5,006,603 A | 4/1991 | Takaki et al. |
| 5,196,460 A | 3/1993 | Lora et al. |
| 5,229,202 A | 7/1993 | Tomono et al. |
| 5,302,666 A | 4/1994 | Hino et al. |
| 5,534,235 A | 7/1996 | Reed et al. |
| 6,103,865 A | 8/2000 | Bae et al. |
| 6,555,617 B1 | 4/2003 | Tanaka et al. |
| 8,445,141 B2 | 5/2013 | Kitamura et al. |
| 8,637,174 B2 | 1/2014 | Haring et al. |
| 8,748,537 B2 | 6/2014 | Naskar et al. |
| 9,453,129 B2 | 9/2016 | Naskar |
| 9,815,985 B2 | 11/2017 | Naskar et al. |
| 2006/0116436 A1 | 6/2006 | Okamitsu et al. |
| 2006/0258836 A1 | 11/2006 | McGrath et al. |
| 2008/0214699 A1 | 9/2008 | Halahmi et al. |
| 2012/0003471 A1 | 1/2012 | Bissett et al. |
| 2013/0084455 A1 | 4/2013 | Naskar et al. |
| 2013/0116383 A1 | 5/2013 | Naskar et al. |
| 2013/0214442 A1 | 8/2013 | Naskar |
| 2014/0045996 A1 | 2/2014 | Naskar et al. |
| 2015/0368471 A1* | 12/2015 | Naskar .................. C08L 97/005 524/72 |
| 2017/0015828 A1 | 1/2017 | Naskar et al. |

FOREIGN PATENT DOCUMENTS

| | | |
|---|---|---|
| CN | 1781980 A | 6/2006 |
| CN | 103331025 A | 10/2013 |
| CN | 103351491 A | 10/2013 |
| JP | 2010111785 A | 5/2010 |
| WO | 2013156996 A1 | 10/2013 |
| WO | 2013156997 A1 | 10/2013 |

(Continued)

OTHER PUBLICATIONS

International Search Report and Written Opinion dated Oct. 26, 2018 issued in PCT/US18/38690.

Bova T. et al., "An approach towards tailoring interfacial structures and properties of multiphase renewable thermoplastics from lignin-nitrile rubber", Green Chemistry (2016), vol. 18, No. 20, pp. 5379-5678 DOI: 10.1039/c6gc01067a.

Saito T. et al., "Development of lignin-based polyurethane thermoplastics", RSC Advances (2013), 3, pp. 21832-21840 DOI: 10.1039/c3ra44794d.

Tran C.D., "A New Class of Renewable Thermoplastics with Extraordinary Performance from Nanostructured Lignin-Elastomers", Advanced Functional Materials (2016), 26, pp. 2677-2685 DOI: 10.1002/adfm.201504990.

International Search Report dated Oct. 12, 2016 issued in PCT/US2016/041984.

(Continued)

*Primary Examiner* — Sheeba Ahmed
(74) *Attorney, Agent, or Firm* — Scully, Scott, Murphy & Presser, P.C.

(57) ABSTRACT

An object comprising: a blend of (i) a phenol-containing polymer and (ii) a nitrile butadiene rubber; wherein the phenol-containing polymer is present in an amount of at least 5 wt % and up to about 95 wt % by total weight of components (i) and (ii). The object may further contain an electrically conducting component dispersed within the blend or on a surface of the blend. Also described is a method of thermal-activated reversible mechanical deformation of the object by (i) deforming the object at a first temperature, which is at or above the glass transition temperature of the object, and applying a stress on the object; (ii) fixing the deformed state by cooling the object to a second temperature of no more than 0° C. while under stress, and removing the stress; and (iii) recovering the object to the original shape by raising the temperature of the object to the first temperature.

12 Claims, 24 Drawing Sheets

(56) References Cited

FOREIGN PATENT DOCUMENTS

WO    2015200159 A1    12/2015

OTHER PUBLICATIONS

Achary P.S. et al, "Reactive Compatibilization of a Nitrile Rubber/Phenolic Resin Blend: Effect on Adhesive and Composite Properties", Journal of Applied Polymer Science (1998), 69, pp. 1187-2101.
Cui C. et al., "Toward Thermoplastic Lignin Polymers; Part II: Thermal & Polymer Characteristics of Kraft Lignin & Derivatives", BioResources (2013), 8(1), pp. 864-886.
Sadeghifar H. et al., "Toward Thermoplastic Lignin Polymers. Part 1. Selective Masking of Phenolic Hydroxyl Groups in Kraft Lignins via Methylation and Oxypropylation Chemistries", Industrial & Engineering Chemistry Research (2012), 51, pp. 16173-16720.
Saito T. et al., "Turning renewable resources into value-added polymer: development of lignin-based thermoplastic", Green Chemistry (2012), 14, pp. 3295-3303.
Nattinen K. et al., "Fully Bio-Based Thermoplastic Lignin Composites", Biomaterials-Towards Industrial Applications, VTT Technical Research Centre of Finland (2013), 20 pages.
International Search Report dated Sep. 14, 2015 issued in PCT/US2015/036873.
U.S. Office Action dated Oct. 26, 2015 issued in U.S. Appl. No. 14/311,893.

\* cited by examiner

SHAPE MEMORY POLYMER BLEND MATERIALS

This invention was made with government support under Prime Contract No. DE-AC05-00OR22725 awarded by the U.S. Department of Energy. The government has certain rights in the invention.

FIELD OF THE INVENTION

The present invention relates generally to polymer blend compositions, and more particularly, to such compositions containing a phenol-containing polymer and/or a nitrile-containing polymer. The present invention further relates to such compositions that have a shape memory characteristic.

BACKGROUND OF THE INVENTION

A thermally induced shape memory effect can be tailored in polymeric materials by judicious selection of molecular architecture, multi-phase morphology, and appropriately networked structures. These materials can be processed sequentially to program their deformability to an extent that the gross network of phases remains unperturbed but a strained assembly of segments is temporarily fixed. This fixing of temporary shape can be erased and the original shape can be recovered by applying heat as stimulant that softens a specific segment and aids the dimensional restoration (M. D. Hager et al., *Progress in Polymer Science* 2015, 49-50: 3-33). Shape recoverable systems include, for example, polymer networks in the presence of nanoparticle cores, ionic coordination complexes, semi-crystalline elastomers, and physically or chemically crosslinked structures. Crosslinked rubbers usually exhibit several hundred percentage strain (K. M. Lee et al., *Macromolecules* 2008, 41(13): 4730-4738).

Some of these rubber materials may exhibit an exceptional level of recoverable strain (e.g., 500%) and self-healing characteristics at room temperature after multiple fractures (P. Cordier P. et al., *Nature* 2008, 451(7181): 977-980). However, often, the repaired sample fails to recuperate its extensibility if the fractured surface is allowed to equilibrate either at high enough temperature or for a prolonged period. The mechanical performance of these polymeric materials tends to be very poor (e.g., 3-4 MPa failure stress). Thus, there would be a significant benefit in materials having exceptional levels of recoverable strain (and particularly, shape memory behavior) along with enhanced mechanical properties, particularly greater stiffness and toughness.

SUMMARY OF THE INVENTION

In one aspect, the present disclosure is directed to a polymer blend material composed, at minimum, of a blend of (i) a phenol-containing polymer (e.g., a lignin) and (ii) a nitrile butadiene rubber. In some embodiments, the polymer blend material includes: (iii) an electrically conducting material, wherein the electrically conducting material is either within the blend containing components (i) and (ii) or on a surface of an object composed of the blend containing components (i) and (ii). Generally, the phenol-containing polymer is present in the polymer blend material in an amount of at least 5 wt % and up to about 95 wt % by total weight of components (i) and (ii).

The polymer blends described herein are generally characterized by a combination of beneficial mechanical properties (e.g., high strength or tensile stress and moderate or high elasticity) that make them particularly useful in critical structural applications where high loads or mechanical stresses are encountered. In some embodiments, the polymer blends described herein are thermoplastic, which advantageously provide them with a sufficient degree of moldability, elasticity, recyclability, and/or ductility to mold them into a variety of useful shapes. In other embodiments, the polymer blends described herein exhibit characteristics of a thermoset elastomer or toughened plastic. In particular embodiments, the polymer blends described herein possess a temperature-controlled shape memory ability and/or an electrical conductivity switching ability in addition to the special physical properties described above.

In another aspect, the present disclosure is directed to methods for producing the above-described polymer blend materials. In particular embodiments, the method includes homogeneously blending a mixture that includes components (i) and (ii) at a temperature of at least 100° C. and up to 200° C., at a shear rate of 10 to 1000 s$^{-1}$, and for a time of 5 to 60 minutes. In the method, the lignin component is preferably present in an amount of at least 5 wt % and up to about 95 wt % by total weight of components (i) and (ii) to achieve the same weight ratio of components in the product. Equipment useful for such mixing include an internal mixer, a two roll-mill, or an extruder. The method may also include a molding process, which may include any of the shaping, heating, pressing and/or printing processes known in the art, to produce a shaped or printed article of the polymer blend material.

In addition to the advantages provided by the superior physical properties of the instantly described polymer blend materials, the instant invention provides additional advantages related to its use of lignin. In particular, lignin is a byproduct in the pulp processing industry and biorefinery, and usually considered a low-valued material. Due to its natural abundance and aromatic structure, the conversion of lignin to high-value products presents a potential pathway for reducing the carbon footprint in the environment and furthermore improves the financial outlook of the paper and biofuel industries. Lignin is used as feedstock for the production of many compounds, such as vanillin, phenol, and ferrulic acid via depolymerization and chemical reactions. However, the demand for such products is not large enough to fulfill large scale utilization of lignin. Lignin is expected to play a more significant role in polymer applications, where demand for replacing fossil-based resins by an eco-friendly material like lignin is much greater.

Herein is reported the unique utilization of lignin by physically interacting or chemically reacting lignin or other phenol-containing polymer with an acrylonitrile-containing copolymer. The process described herein can advantageously use a much higher weight ratio of lignin than conventionally used in the art (e.g., at least 30%, 40%, 50%, or even 60%), and can also advantageously dispense with the use of additives or modifying agents generally used for improving tensile strength, while at the same time producing a polymer blend material with exceptional physical properties, such as high strength or tensile stress along with moderate to high elasticity. The described process can also advantageously dispense with a solvent, which makes the process even more eco-friendly.

A further advantage of the instant method is that it does not require chemical functionalization of lignin or other phenol-containing polymer for bonding with the acrylonitrile copolymer prior to melt-extrusion based processing. In other words, the instant process can produce a polymer blend material with exceptional physical properties by melt processing of only the lignin and acrylonitrile copolymer components (i.e., a binary mixture) under the above-described conditions involving temperature, shear rate, processing time, acrylonitrile content, and weight ratios of components, without employing chemical functionalization of lignin for bonding with the acrylonitrile copolymer and without incorporation of a modifying agent (e.g., carbon particles, silica or silicate particles, ether-containing polymers, plasticizers, and Lewis acid compounds) for imparting improved physical properties.

In another aspect, the present disclosure is directed to a method of thermal-activated reversible mechanical deformation of an object, as described above, having a temperature-controlled shape memory characteristic (i.e., composed of at least components i and ii, or at least components i, ii, and iii). The method includes: (i) providing an object composed of the blend described above and having an original shape below the glass transition temperature of the object, and deforming the object at a first temperature, which is at or above the glass transition temperature of the object, by applying a stress on the object at the first temperature to result in the object being in a deformed state relative to the original shape; (ii) fixing the deformed state by cooling the object to a second temperature of no more than 0° C., while in the deformed state and while under stress, and then removing the stress at the second temperature; and (iii) recovering the object to the original shape by raising the temperature of the object to the first temperature. Significantly, the object, after step (iii), possesses the ability to reversibly interconvert between deformed and original shapes by being alternately subjected to fixing a deformed state of the object according to step (ii) and recovering the original shape of the object according to step (iii). In the case where the object includes an electrically conducting material within the blend or on a surface of an object composed of the blend, the thermally induced change in shape alters the electrical conductivity of the object. Thus, the electrically conducting object may behave, for example, as a stress or strain sensor or as an electrical switch.

In particular embodiments, the present disclosure reports a simple approach for programming electrical conductivity in a renewable shape memory material containing a conductive leathery skin composed of a layer of metallic nanoparticles. The combination of metallic layer and the material's unique shape fixing and recovery attribute permits cyclic programming and restoration of the devices' electrical conductivity at 20-50% strain amplitude and at 50° C.-100° C., which is significantly above the glass transition temperature ($T_g$) of the rubbery matrix. Low molecular weight lignin bio-polymers with different molecular architectures and functionalities have herein been incorporated into an acrylonitrile-butadiene rubber to tune the composites' thermomechanical response. An exemplary acrylonitrile-butadiene-lignin (ABL) composition exhibits a 28° C. increase in $T_g$ and an order of magnitude elevation in modulus compared to the neat rubber (acrylonitrile-butadiene) matrix. The chemical crosslinking and hydrogen bonding within ABL offer mechanical stiffness, strain fixity, and temperature-stimulated recovery (up to 98%) for shape-memory applications. As further discussed below, softwood lignin-based ABL exhibits more than an order of magnitude larger stored and recoverable elastic work density than the hardwood lignin-based ABL or the neat rubber. Programmable and recoverable electrical conductivity devised in renewable ABL compositions with 40-60 wt. % lignin may be used in, for example, strain sensing applications and human motion detection.

BRIEF DESCRIPTION OF THE FIGURES

FIG. 1A: Representative chemical structures of lignins. Examples of lignin substructures used in this study were determined by Heteronuclear Multiple Quantum Coherence (HMQC) NMR spectroscopy: (A) β-O-4'; (B) β-5' (phenylcoumaran structure); (C) β-β' (resinol structure); (G) guaiacylpropane unit; (S) syringyl propane unit; (S') syringyl propane unit with carbonyl at Cα; (H) p-hydroxyphenolpropane unit; FIG. 1B: $^{13}C$ NMR spectra of hardwood (HW) lignin (top) and softwood (SW) lignin (bottom); FIG. 1C: Two-dimensional (2D) NMR (HMQC) NMR spectra of HW lignin and SW lignin.

FIG. 2A: Three-dimensional graph showing one cycle of deformation, fixing, and recovery. FIG. 2B: The corresponding programmed shape recovery of ABL networks with a magnified view showing a network structure of a nitrile-butadiene elastomer (NBR) and lignin in the presence of hydrogen bonds formed by (—OH) and (—C≡N) groups. FIG. 2C: Principle of switchable and programmable electrical conductivity of an electrically conductive layer assembled on a shape-memory substrate. The dashed lines indicate the breaking of the electrically conductive layer, which results in the decrease in electrical conductivity (dimensions in the illustrations are not to scale).

FIG. 3A: Graph showing differential scanning calorimetry data of pristine NBR41 and the composites with selected hardwood and softwood lignin contents, indicating increasing trends in the glass transition temperature of NBR41. FIG. 3B: Graph showing frequency-dependent storage modulus ($T_{ref}$=190° C.). FIG. 3C: Graph showing frequency-dependent complex viscosity ($T_{ref}$=190° C.) of the corresponding samples. FIGS. 3D and 3E: Graphs showing thermal stability of pristine NBR41, softwood (SW) and hardwood (HW) lignins, respectively, and their corresponding ABL composites. FIG. 3F: Fourier transform infrared spectroscopy data of the corresponding samples exhibiting hydrogen-bonding formation in the presence of lignins.

Figure 5A:
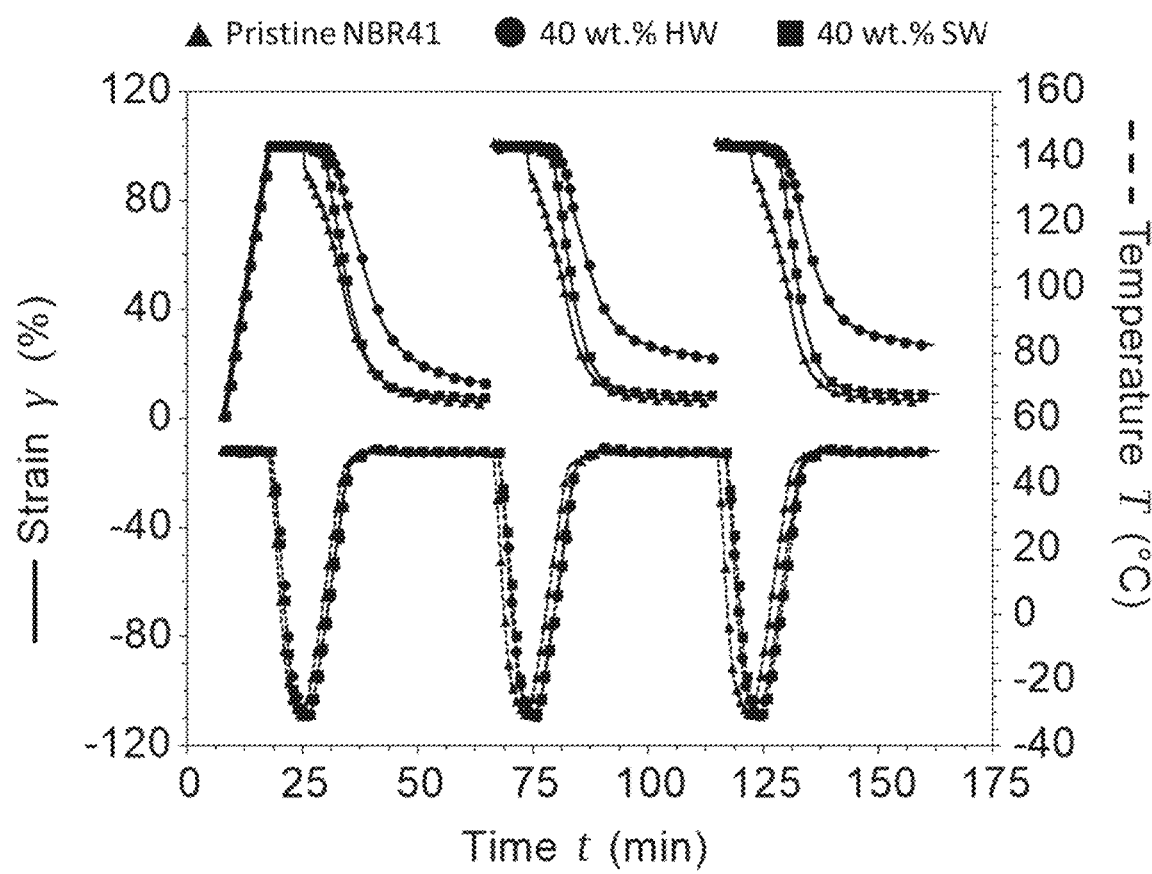
FIGS. 5A-5F. Representative strain fixity and recovery of selected SW- and HW-lignin-based ABLs at two investigated temperatures, 50° C. and 100° C. (the solid and dashed lines are the strain and temperature curves, respectively). Three cycles of strain deformation-fixity-recovery at (a) 50° C. of pristine NBR41, 40 wt. % lignin containing ABL from both HW and SW lignin (FIG. 5A); (b) 100° C. of pristine NBR41 and 50 wt % SW lignin ABL (FIG. 5B); and (c, d)
Figure 5B:
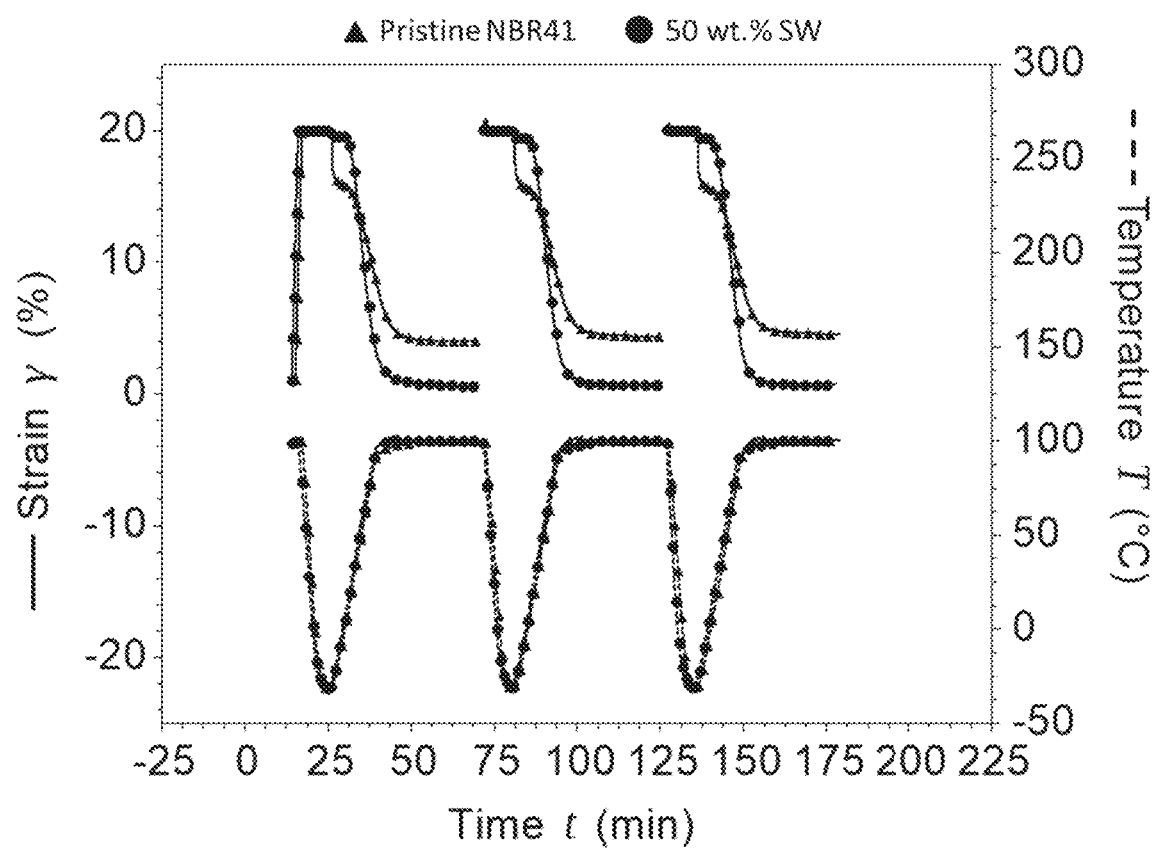

their corresponding computed strain fixity and recovery (FIGS. C and D, respectively). The deformation cycles showing stress-strain curves at (e) 50° C. of pristine NBR41, 40 wt. % lignin containing ABL from both HW and SW lignin (FIG. 5E), and (f) 100° C. of pristine NBR41 and 50 wt. % SW lignin ABL (FIG. 5F).

Figures 6A, 6B, 6C, 6D:
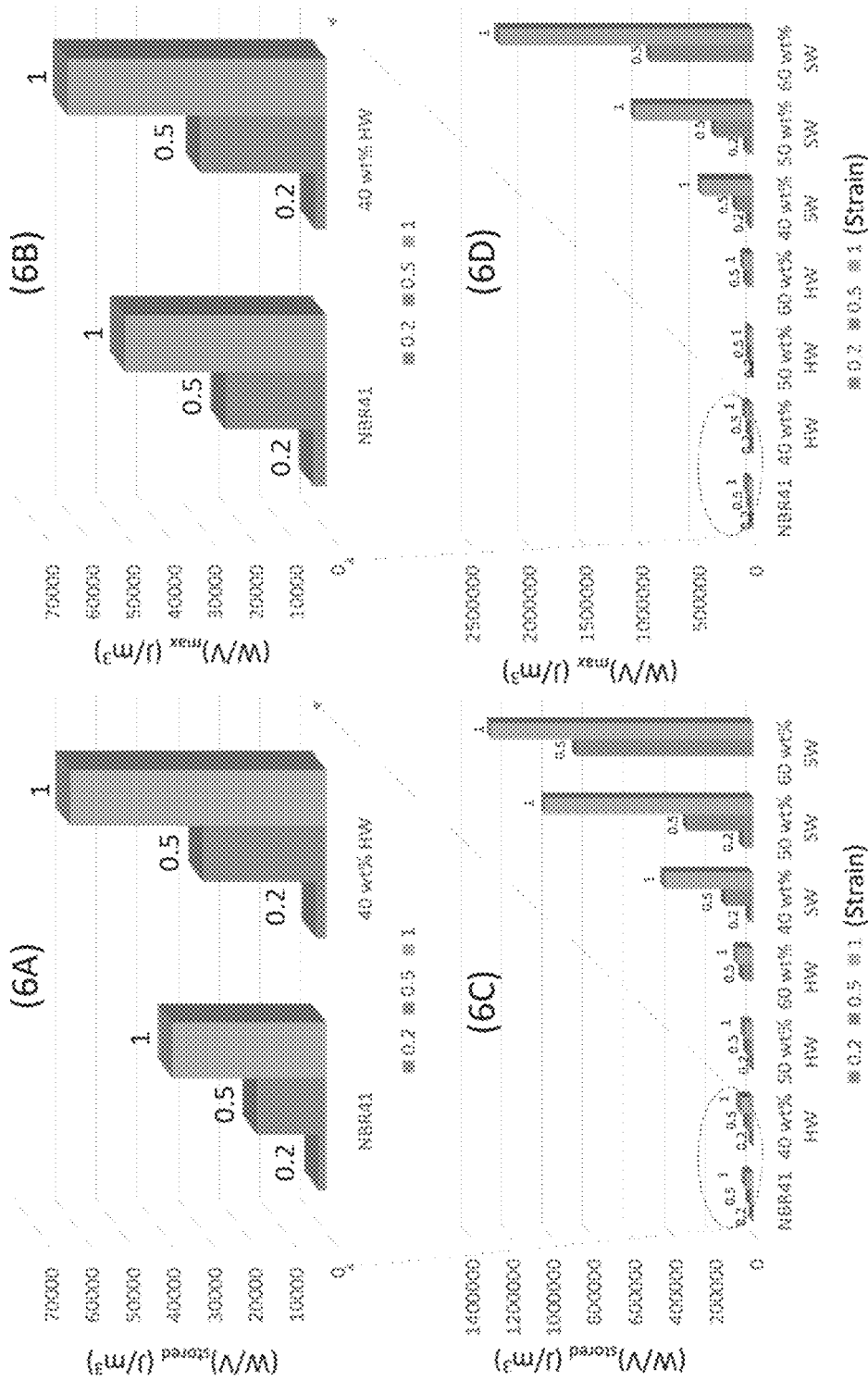

FIGS. 6A-6D. FIGS. 6A and 6C show results of stored elastic work density as a function of strain of different investigated samples of NBR41 and NBR41 mixed with different weight percentages (40-60 wt %) of either SW or HW lignin, wherein FIG. 6A is an enlargement of the NBR41 and 40 wt % HW lignin bars in FIG. 6C. FIGS. 6B and 6D show results of maximum elastic work density as a function of strain of the corresponding samples shown in FIGS. 6A and 6C, wherein FIG. 6B is an enlargement of the NBR41 and 40 wt % HW lignin bars in FIG. 6D.

Figure 7:
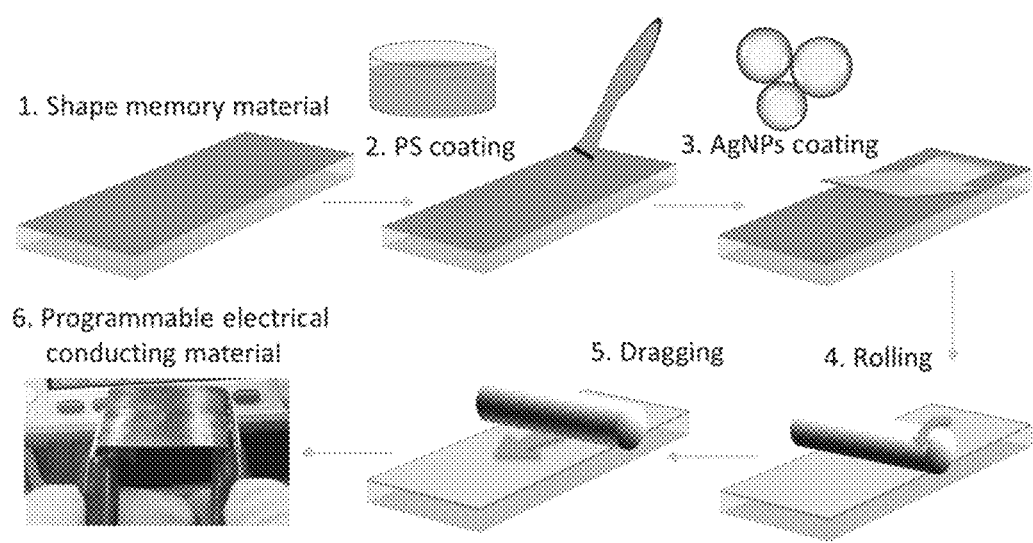

FIG. 7. Exemplary coating procedure used to fabricate a programmable electrically conducting material in which silver nanoparticles are coated on an ABL shape memory substrate: Shape memory material, ABL with 40 wt. % SW-lignin (1), polystyrene (PS) coating (2), silver nanoparticle blade coating (3), rolling (4), dragging (5), and handling of programmable electrical conducting material (6) (dimensions in the cartoons are not to scale).

Figure 8:
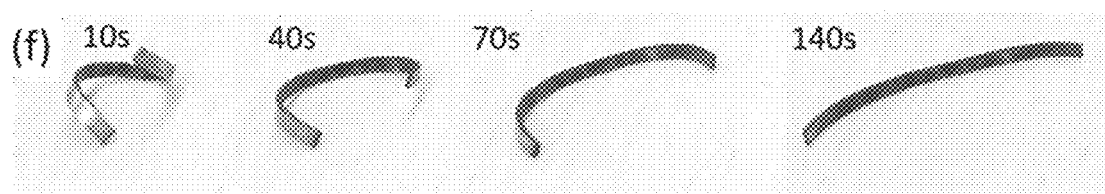

FIG. 8. Time-lapsed photographs showing recovery of a shape-programmed electrically conducting material after placing it on a hotplate at 100° C. The recovery shows the programmable and switchable electrical conducting characteristics of an ABL substrate coated with silver nanoparticles.

Figures 9A, 9B:
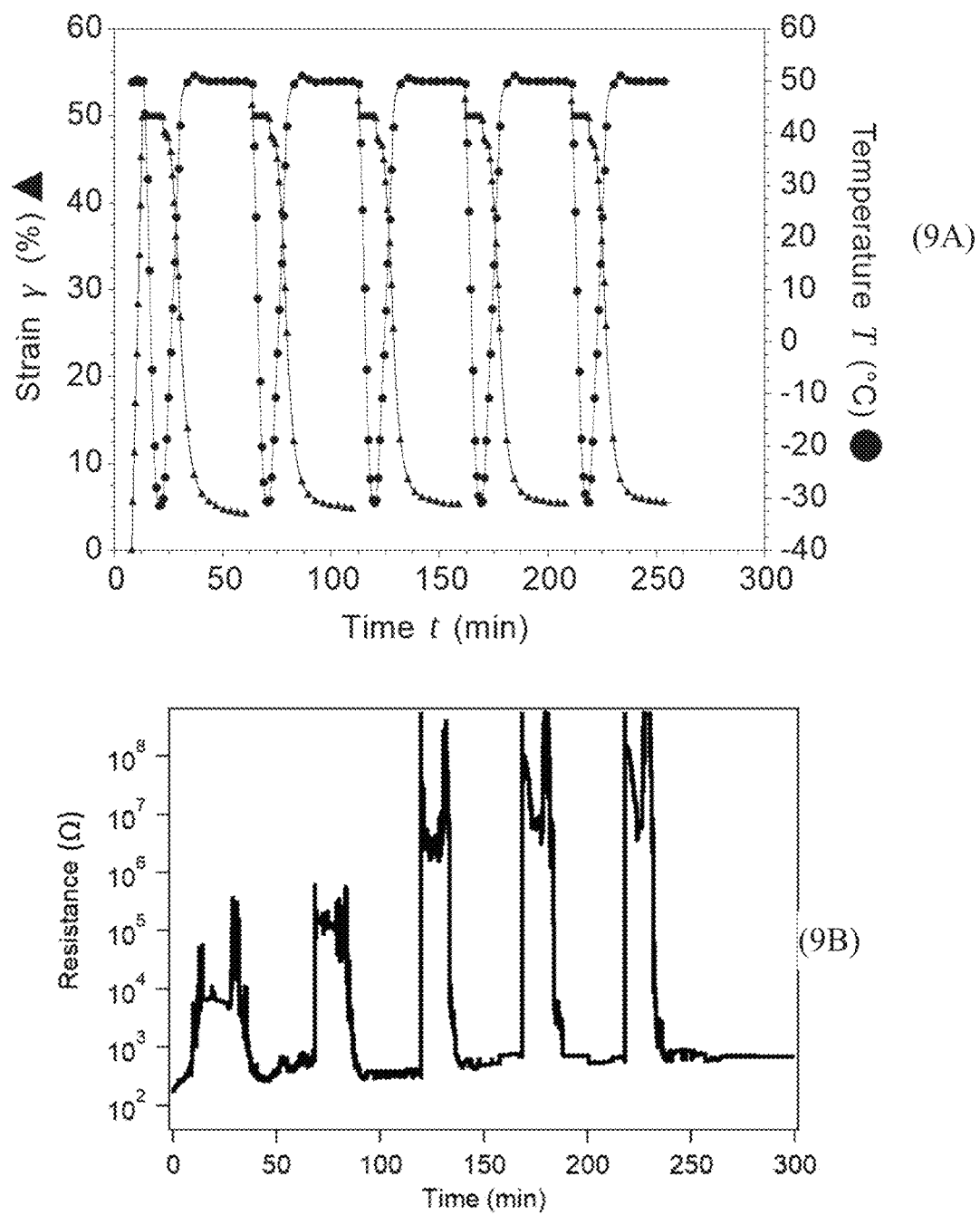
Figures 9C, 9D, 9E:
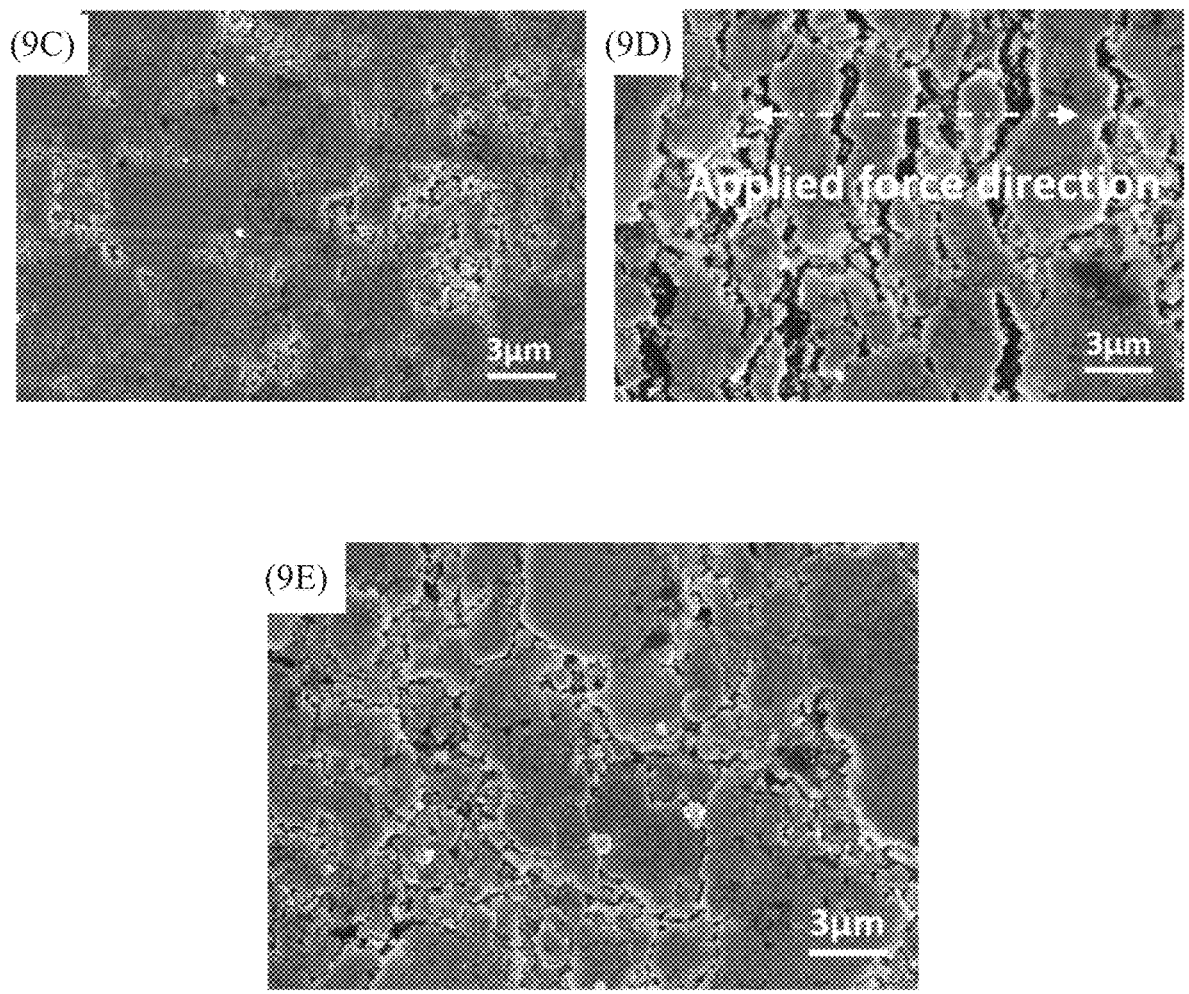

FIGS. 9A-9E. FIG. 9A: Graph showing multiple strain deformations and recoveries of the programmable and switchable electrical conducting silver particle-coated ABL, an electronic skin; FIG. 9B: Graph showing the corresponding electrical resistance data when high strain amplitude (50%) was applied at 50° C. FIGS. 9C-9E are scanning electron microscopy images of healed electrically conducting silver nanoparticle layer after stretching and programming: FIG. 9C is an initial state of the electronic skin; FIG. 9D is the deformed and programmed electronic skin (stretching direction denoted by the white arrows); and FIG. 9E is the shape-recovered electronic skin.

DETAILED DESCRIPTION OF THE INVENTION

In a first aspect, the present disclosure is directed to a polymer blend material that includes a blend of (i) a phenol-containing polymer and (ii) a nitrile butadiene rubber (NBR). The polymer blend material generally has a shape, in which case it can be referred as an object composed of the polymer blend material. The object then naturally possesses one or more surfaces that define a volume occupied by the polymer blend material.

The term "polymer blend" or "blend," as used herein, refers to a solid solution in which discrete microscopic regions of components (i) and/or (ii) are present. The polymer blend generally exhibits substantial integration (i.e., substantially homogeneous) of the components at the microscale or approaching the molecular level, but without losing each component's identity. Generally, one of the components (i) or (ii) functions as a matrix in which domains (i.e., particles or microscopic regions) of the other component (i) or (ii) are dispersed. In particular embodiments of the polymer blend material, component (ii), i.e., the NBR component, functions as a matrix in which the lignin component (i) is dispersed in the form of domains having any of the exemplary sizes provided hereinbelow. If component (iii) is included, component (iii) may likewise be dispersed in the form of domains in a matrix containing components (i) and (ii). The domains are generally up to or less than 100 microns (100 μm) in size. In different embodiments, the domains are up to or less than, for example, 50 μm, 10 μm, 5 μm (5000 nm), 2 μm (2000 nm), 1 μm (1000 nm), 800 nm, 500 nm, 200 nm, 100 nm, 50 nm, 25 nm, 10 nm, or 5 nm. Any of the above exemplary domain sizes may alternatively represent a mean or median domain size, as found in a particle size distribution curve. For example, in some embodiments, at least 80%, 85%, 90%, or 95% of the domains have a size up to or less than any exemplary values provided above. In some embodiments, substantially all (e.g., above 95%) or all (i.e., 100%) of the domains have a size up to or less than any exemplary values provided above.

Component (i), the phenol-containing polymer, can be any polymer containing phenolic groups, wherein phenolic groups are understood to contain at least one hydroxy (OH) group bound to a benzene ring. Some examples of phenol-containing polymers include lignin, tannin, poly(vinylphenol), poly(styrene-co-allyl alcohol), phenol-formaldehyde resins, novolaks, and resoles. In particular embodiments, the phenol-containing polymer is a lignin. The lignin can be any of the wide variety of lignin compositions found in nature, as found in lignocellulosic biomass and as known in the art.

As known in the art, the lignin compositions found in nature are generally not uniform. Lignin is a random copolymer that shows significant compositional variation between plant species. Many other conditions, such as environmental conditions, age, and method of processing, influence the lignin composition. Lignins differ mainly in the ratio of three alcohol units, i.e., p-coumaryl alcohol, guaiacyl alcohol, and sinapyl alcohol. The polymerization of p-coumaryl alcohol, coniferyl alcohol, and sinapyl alcohol forms the p-hydroxyphenyl (H), guaiacyl (G) and syringyl (S) components of the lignin polymer, respectively. The precursor lignin can have any of a wide variety of relative weight percents (wt %) of H, G, and S components. As observed in some seeds, lignin may also consist of caffeyl alcohol units, e.g., Chen et al. PNAS, 109(5), 1772-1777 (2012). For example, the precursor lignin may contain, independently for each component, at least, up to, or less than 1 wt %, 2 wt %, 5 wt %, 10 wt %, 20 wt %, 30 wt %, 40 wt %, 50 wt %, 60 wt %, 70 wt %, 80 wt %, or 90 wt %, or within a range thereof, of any of the caffeyl alcohol, H, G, and S components. Typically, the sum of the wt % of each alcohol component is 100%, or at least 98% if other minor components are considered. Different wood and plant sources (e.g., hardwood, softwood, poplar wood, or grass-derived lignins, such as switchgrass, corn, bamboo, perennial grass, orchard grass, alfalfa, wheat, and bagasse) often widely differ in their lignin compositions, and are all considered herein as sources of lignin. In some embodiments, depending on the desired characteristics of the polymer blend material, any one or more types of lignin, as described above, may be excluded from the polymer blend material.

Besides the natural variation of lignins, there can be further compositional variation based on the manner in which the lignin has been processed. For example, the precursor lignin can be a Kraft lignin, sulfite lignin (i.e., lignosulfonate), or a sulfur-free lignin. As known in the art, a Kraft lignin refers to lignin that results from the Kraft process. In the Kraft process, a combination of sodium hydroxide and sodium sulfide (known as "white liquor") is reacted with lignin present in biomass to form a dark-colored lignin bearing thiol groups. Kraft lignins are generally water- and solvent-insoluble materials with a high concentration of phenolic groups. They can typically be made soluble in aqueous alkaline solution. As also known in the art, sulfite lignin refers to lignin that results from the sulfite process. In the sulfite process, sulfite or bisulfite (depending on pH), along with a counterion, is reacted with lignin to form a lignin bearing sulfonate ($SO_3H$) groups. The sulfonate groups impart a substantial degree of water-solubility to the sulfite lignin. There are several types of sulfur-free lignins known in the art, including lignin obtained from biomass conversion technologies (such as those used in ethanol production), solvent pulping (i.e., the "organosolv" process), and soda pulping. In particular, organosolv lignins are obtained by solvent extraction from a lignocellulosic source, such as chipped wood, followed by precipitation. Due to the significantly milder conditions employed in producing organosolv lignins (i.e., in contrast to Kraft and sulfite processes), organosolv lignins are generally more pure, less degraded, and generally possess a narrower molecular weight distribution than Kraft and sulfite lignins. These lignins can also be thermally devolatilized to produce a variant with less aliphatic hydroxyl groups, and molecularly restructured forms with an elevated softening point. Any one or more of the foregoing types of lignins may be used (or excluded) as a component in the method described herein for producing a polymer blend.

The lignin may also be an engineered form of lignin having a specific or optimized ratio of H, G, and S components. Lignin can be engineered by, for example, transgenic and recombinant DNA methods known in the art that cause a variation in the chemical structure in lignin and overall lignin content in biomass (e.g., F. Chen, et al., *Nature Biotechnology*, 25(7), pp. 759-761 (2007) and A. M. Anterola, et al., *Phytochemistry*, 61, pp. 221-294 (2002)). The engineering of lignin is particularly directed to altering the ratio of G and S components of lignin (D. Guo, et al., *The Plant Cell*, 13, pp. 73-88, (Jan. 2001). In particular, wood pulping kinetic studies show that an increase in S/G ratio significantly enhances the rate of lignin removal (L. Li, et al., *Proceedings of The National Academy of Sciences of The United States of America*, 100 (8), pp. 4939-4944 (2003)). The S units become covalently connected with two lignol monomers; on the other hand, G units can connect to three other units. Thus, an increased G content (decreasing S/G ratio) generally produces a highly branched lignin structure with more C—C bonding. In contrast, increased S content generally results in more β-aryl ether (β-O-4) linkages, which easily cleave (as compared to C—C bond) during chemical delignification, e.g., as in the Kraft pulping process. It has been shown that decreasing lignin content and altering the S/G ratio improve bioconvertability and delignification. Thus, less harsh and damaging conditions can be used for delignification (i.e., as compared to current practice using strong acid or base), which would provide a more improved lignin better suited for higher value-added applications, including manufacturing of tough polymer blends, carbon materials production (e.g., carbon fiber, carbon powder, activated carbon, microporous and mesoporous carbon) and pyrolytic or catalytic production of aromatic hydrocarbon feedstock.

Lab-scale biomass fermentations that leave a high lignin content residue have been investigated (S. D. Brown, et al., *Applied Biochemistry and Biotechnology*, 137, pp. 663-674 (2007)). These residues will contain lignin with varied molecular structure depending on the biomass source (e.g., wood species, grass, and straw). Production of value-added products from these high quality lignins would greatly improve the overall operating costs of a biorefinery. Various chemical routes have been proposed to obtain value-added products from lignin (J. E. Holladay, et al., Top Value-Added Chemicals from Biomass: Volume II—Results of Screening for Potential Candidates from Biorefinery Lignin, DOE Report, PNNL-16983 (October 2007)).

The lignin may, in some embodiments, be a crosslinked lignin that is melt-processible or amenable to melt-processing. The term "crosslinked" can mean, for example, that the lignin contains methylene (i.e., —$CH_2$—) and/or ethylene (i.e., —$CH_2CH_2$—) linkages (i.e., linking groups) between phenyl ring carbon atoms in the lignin structure. By being "melt-processible" is meant that the crosslinked lignin can be melted or converted to a molten, highly viscous, or rubbery state starting at a particular glass transition temperature. The melted or highly viscous lignin can then be more easily processed, such as by mixing, molding, applying on a surface, or dissolving in a solvent. In some embodiments, the lignin is not crosslinked. In particular embodiments, the lignin component exhibits a suitable steady shear viscosity to render it as a malleable film-forming material at the processing temperature and shear rate employed. Typically, at a melt processing condition, the steady shear viscosity of the lignin component is at least or above 100 Pa·s, 500 Pa·s, or 1000 Pa·s, or within a range therein. In some embodiments, the lignin may be oxidized (e.g., by exposure to chemical oxidizing agent), while in other embodiments, the lignin is not oxidized. In some embodiments, the lignin is chemically unmodified relative to its natural extracted or isolated form. In some embodiments, the lignin is chemically modified by acetylation, oxypropylation, hydroxymethylation, epoxidation, or the like, as known in the art. In some embodiments, the lignin is plasticized with solvents or plasticizers to induce melt-processability. Solvents and plasticizers include, for example, dimethylsulfoxide, dimethylacetamide, polyoxyalkylene, and glycerol, as known in the art. In some embodiments, the use of a solvent or plasticizer is excluded.

In some embodiments, the lignin has a number-average or weight-average molecular weight (i.e., $M_n$ or $M_w$, respectively) of about, up to, or less than 300, 500, 1,000, 3,000, 5,000, 8,000, 10,000, 50,000, 100,000, 500,000 or 1,000,000 g/mol, (e.g., G. Fredheim, et al., J. Chromatogr. A, 2002, 942, 191; and A. Tolbert, et al., Biofuels, Bioproducts & Biorefining 8(6) 836-856, 2014) wherein the term "about" generally indicates no more than ±10%, ±5%, or ±1% from an indicated value. The glass transition temperature ($T_g$) of the crosslinked lignin is generally above room temperature (typically, 15, 20, 25, or 30° C.). In different embodiments, the lignin (either isolated lignin from biomass or its cross-linked derivative) has a glass transition temperature of precisely, about, at least, or greater than 20° C., 25° C., 30° C., 40° C., 50° C., 60° C., 70° C., 80° C., 90° C., 100° C., 110° C., 120° C., 130° C., 140° C., 150° C., 160° C., 170° C., 180° C., 190° C., 200° C., 210° C., 220° C., 230° C., 240° C., or 250° C., or a $T_g$ within a range bounded by any two of the foregoing values. The polymer blend material in which the lignin is incorporated may also possess any of the glass transition temperatures or ranges thereof provided above, and more typically about 20-40° C.

The lignin (in either raw form isolated from biomass or its crosslinked derivative) may be substantially soluble in a polar organic solvent or aqueous alkaline solution. As used herein, the term "substantially soluble" generally indicates that at least 1, 2, 5, 10, 20, 30, 40, 50, or 60 grams of the lignin completely dissolves in 1 deciliter (100 mL) of the polar organic solvent or aqueous alkaline solution. In other embodiments, the solubility is expressed as a wt % of the lignin in solution. In some embodiments, the lignin has sufficient solubility to produce at least a 5 wt %, 10 wt %, 15 wt %, 20 wt %, 30 wt %, 40 wt %, or 50 wt % solution in the polar organic solvent or aqueous alkaline solution. The polar organic solvent can be aprotic or protic. Some examples of polar aprotic solvents include the organoethers (e.g., diethyl ether, tetrahydrofuran, and dioxane), nitriles (e.g., acetonitrile, propionitrile), sulfoxides (e.g., dimethylsulfoxide), amides (e.g., dimethylformamide, N,N-dimethylacetamide), organochlorides (e.g., methylene chloride, chloroform, 1,1,-trichloroethane), ketones (e.g., acetone, 2-butanone), and dialkylcarbonates (e.g., ethylene carbonate, dimethylcarbonate, diethylcarbonate). Some examples of polar organic protic solvents include the alcohols (e.g., methanol, ethanol, isopropanol, n-butanol, t-butanol, the pentanols, hexanols, octanols, or the like), diols (e.g., ethylene glycol, diethylene glycol, triethylene glycol), and protic amines (e.g., ethylenediamine, ethanolamine, diethanolamine, and triethanolamine). The aqueous alkaline solution can be any aqueous-containing solution having a pH of at least (or over) 8, 9, 10, 11, 12, or 13. The alkalizing solute can be, for example, an alkali hydroxide (e.g., NaOH or KOH), ammonia, or ammonium hydroxide. Combinations of any of these solvents may also be used. In some embodiments, the lignin is dissolved in a solvent, such as any of the solvents described above, when used to form the polymer blend. The solvent may or may not be incorporated into the final polymer blend material. In some embodiments, one or more classes or specific types of solvents are excluded from any of the components (i) or (ii) or from the polymer blend material altogether.

Component (ii), the nitrile butadiene rubber (NBR) component, is well known in the art. NBR may alternatively be referred to as nitrile rubber (NR). As well known, NBR is produced by copolymerization of butadiene (generally, 1,3-butadiene, but may include 1,2-butadiene) and acrylonitrile. Moreover, the NBR may be standard NBR (i.e., without additional reaction or functionalization) or may be a derivatized or functionalized form of NBR, such as hydrogenated NBR or carboxylated NBR. Generally, the NBR has an acrylonitrile content of at least 20 mol %. In different embodiments, the acrylonitrile rubber component has an acrylonitrile content of about, at least, or above 20, 25, 30, 33, 35, 38, 40, 42, 45, 48, 50, 52, or 55 mol %, or an acrylonitrile content within a range bounded by any two of the foregoing values.

The NBR component may, in some embodiments, contain one or more other polymeric units, such as one or more of styrene, divinyl benzene, acrylate, and/or methacrylate units if the presence of such additional units do not interfere with the aims and goals of the present invention. For purposes of the invention, the presence of one or more additional units should not result in a non-elastomeric (i.e., non-rubbery) material. In the case where styrene units are included, the component (ii) may be more specifically referred to as an "acrylonitrile butadiene styrene" or "ABS" component. The NBR component generally possesses the known or expected physical attributes of nitrile butadiene rubber materials of the art, such as a substantial elasticity, as generally evidenced in a typical ultimate elongation of at least 50%, 100%, 150%, 200%, 250%, 300%, 350%, 400%, 450%, or 500%. In some embodiments, the acrylonitrile rubber component contains functionalizing groups aside from nitrile and unsaturated carbon-carbon bonds, such as carboxy, hydroxy, ester, amino, or epoxy groups. In other embodiments, one or all of such functionalizing groups are excluded from the acrylonitrile rubber component. In some embodiments, any functionalizing groups capable of reacting with the lignin component (e.g., phenol- or hydroxy-reactive groups, such as epoxy or aldehyde groups) to form covalent bonds therewith are not present in the acrylonitrile rubber component.

The NBR component can also have any of a wide range of weight-average molecular weights ($M_w$), such as precisely, about, at least, above, up to, or less than, for example, 2,500 g/mol, 3,000 g/mol, 5,000 g/mol, 10,000 g/mol, 50,000 g/mol, 100,000 g/mol, 150,000 g/mol, 200,000 g/mol, 300,000 g/mol, 400,000 g/mol, 500,000 g/mol, or 1,000,000 g/mol, or a molecular weight within a range bounded by any two of the foregoing exemplary values. The NBR component may also have any of a wide range of number-average molecular weights $M_n$, wherein n can correspond to any of the numbers provided above for $M_w$.

In the polymer blend material, the phenol-containing polymer component (i) is generally present in an amount of at least 5 wt % and up to about 95 wt % by total weight of components (i) and (ii). As both components (i) and (ii) are present in the polymer blend, each component must be in an amount less than 100 wt %. In different embodiments, the phenol-containing polymer component is present in the polymer blend material in an amount of about, at least, or above, for example, 5, 10, 15, 20, 25, 30, 35, 40, 45, 50, 55, 60, 65, 70, 75, 80, 90, or 95 wt %, or in an amount within a range bounded by any two of the foregoing exemplary values, e.g., at least or above 15, 20, 25, 30, 35, or 40 wt %, and up to 45, 50, 55, 60, 65, or 70 wt % by total weight of components (i) and (ii). In more particular embodiments, the lignin component is present in an amount of 20, 25, 30, 35, or 40 wt %, and up to 45, 50, 55, or 60 wt % by total weight of components (i) and (ii), or more particularly, at least 30, 35, or 40 wt %, and up to 45, 50, or 55 wt % by total weight of components (i) and (ii).

The polymer blend material described herein may or may not include a component other than the components (i), (ii), and (iii). For example, in some embodiments, an agent that favorably modifies the physical properties (e.g., tensile strength, modulus, and/or elongation) may be included. Some of these modifying agents include, for example, carbon particles, silicon-containing particles (e.g., silica or silicate particles), ether-containing polymers, Lewis acid compounds, solvents or plasticizers, and metal oxide compounds. In some embodiments, one or more such modifying agents are each independently, or in total, present in an amount of up to or less than 40, 30, 20, 15, 10, 5, 4, 3, 2, or 1 wt %. In some embodiments, one or more of such modifiers are excluded from the polymer blend material.

The carbon particles, if present in the polymer blend material, can be any of the carbon particles known in the art that are composed at least partly or completely of elemental carbon, and may be conductive, semiconductive, or non-conductive. The carbon particles may be nanoparticles (e.g., at least 1, 2, 5, or 10 nm, and up to 20, 50, 100, 200, or 500 nm), microparticles (e.g., at least 1, 2, 5, or 10 µm, and up to 20, 50, 100, 200, or 500 µm), or macroparticles (e.g., above 500 µm, or at least or up to 1, 2, 5, 10, 20, 50, or 100 mm). Some examples of carbon particles include carbon black ("CB"), carbon onion ("CO"), spherical fullerenes (e.g., buckminsterfullerene, i.e., $C_{60}$, as well as any of the smaller or larger buckyballs, such as $C_{20}$ or $C_{70}$), tubular fullerenes (e.g., single-walled, double-walled, or multi-walled carbon nanotubes), carbon nanodiamonds, and carbon nanobuds, all of which have compositions and physical and electrical properties well-known in the art. As known in the art, fully graphitized carbon nanodiamonds can be considered to be carbon onions.

In some embodiments, the carbon particles are made exclusively of carbon, while in other embodiments, the carbon particles can include an amount of one or a combination of non-carbon non-hydrogen (i.e., hetero-dopant) elements, such as nitrogen, sulfur, boron, silicon, phosphorus, or a metal, such as an alkali metal (e.g., lithium), alkaline earth metal, transition metal, main group metal (e.g., Al, Ga, or In), or rare earth metal. Some examples of binary carbon compositions include silicon carbide (SiC) and tungsten carbide (WC). The amount of hetero element can be a minor amount (e.g., up to 0.1, 0.5, 1, 2, or 5 wt % or mol %) or a more substantial amount (e.g., about, at least, or up to 10, 15, 20, 25, 30, 40, or 50 wt % or mol %). In some embodiments, any one or more of the specifically recited classes or specific types of carbon particles are excluded.

In some embodiments, the carbon particles can be any of the high strength carbon fiber compositions known in the art. As known in the art, the carbon fiber has its length dimension longer than its width dimension. Some examples of carbon fiber compositions include those produced by the pyrolysis of polyacrylonitrile (PAN), viscose, rayon, pitch, lignin, polyolefins, as well as vapor grown carbon nanofibers, single-walled and multi-walled carbon nanotubes, any of which may or may not be heteroatom-doped, such as with nitrogen, boron, oxygen, sulfur, or phosphorus. The carbon particles may also be two-dimensional carbon materials, such as graphene, graphene oxide, or graphene nanoribbons, which may be derived from, for example, natural graphite, carbon fibers, carbon nanofibers, single walled carbon nanotubes and multi-walled carbon nanotubes. The carbon fiber typically possesses a high tensile strength, such as at least 500, 1000, 2000, 3000, 5000, 7,000, or 10,000 MPa, or higher, with a degree of stiffness generally of the order of steel or higher (e.g., 100-1000 GPa). In some embodiments, any one or more classes or specific types of the foregoing carbon particles are excluded from the polymer blend.

The ether-containing polymer, if present in the polymer blend material, can be, for example, a polyalkylene oxide (i.e., polyethylene glycol) or a copolymer thereof. Some examples of polyalkylene oxides include the polyethylene oxides, polypropylene oxides, polybutylene oxides, and copolymers thereof with ethylene, propylene, or allyl glycidyl ether. The ether-containing polymer may also be, for example, a polyvinyl cyanoethyl ether, as described in, for example, U.S. Pat. No. 2,341,553, the contents of which are herein incorporated by reference. The ether-containing polymer may also be, for example, an etherified form of PVA, such as poly(vinyl methyl ether), which may correspond to CAS No. 9003-09-2. The ether-containing polymer may also be, for example, a phenyl ether polymer, which may be a polyphenyl ether (PPE) or polyphenylene oxide (PPO). The ether-containing polymer may also include cyclic ether groups, such as epoxide or glycidyl groups, or as further described in, for example, U.S. Pat. No. 4,260,702, the contents of which are herein incorporated by reference. The cyclic ether polymer may also be a cyclic anhydride modified polyvinyl acetal, as further described in U.S. Pat. No. 6,555,617, or a cyclic or spirocyclic polyacetal ether, as further described in, for example, A. G. Pemba, et al., *Polym. Chem.*, 5, 3214-3221 (2014), the contents of which are herein incorporated by reference. In yet other embodiments, the ether-containing polymer may be a cyclic or non-cyclic thioether-containing polymer, such as a polyphenyl thioether or polyphenylene sulfide. In some embodiments, any one or more classes or specific types of the foregoing ether-containing polymers are excluded from the polymer blend.

The Lewis acid compounds, if present in the polymer blend material, can be any of the compounds known in the art having Lewis acid character, i.e., strongly electrophilic by virtue of a deficiency of electrons. Some examples of Lewis acid compounds include boron-containing compounds (e.g., boric acid, borates, borate esters, boranes, and boron halides, such as $BF_3$, $BCl_3$, and $BBr_3$), aluminum-containing compounds (e.g., aluminum hydroxide, aluminates, aluminate esters, and aluminum halides, such as $AlF_3$, $AlCl_3$, and $AlBr_3$), and tin-containing compounds (e.g., stannic acid, tin esters (e.g., tin(II) acetate or tin(II) 2-ethylhexanoate), tin alkoxides (e.g., tin(IV) ethoxide), and tin halides, such as $SnF_4$, $SnCl_4$, $SnBr_4$, and $SnI_4$). In some embodiments, any one or more classes or specific types of the foregoing Lewis acid compounds are excluded from the polymer blend.

The metal oxide compounds, if present in the polymer blend material, can be any metal oxide composition, typically particulate in form, that can function to improve a physical characteristic of the polymer blend material. The metal of the metal oxide composition can be, for example, an alkali metal, alkaline earth metal, main group metal, transition metal, or lanthanide metal. Some examples of alkali metal oxides include $Li_2O$, $Na_2O$, $K_2O$, and $Rb_2O$. Some examples of alkaline earth metal oxide compositions include BeO, MgO, CaO, and SrO. Some examples of main group metal oxide compositions include $B_2O_3$, $Ga_2O_3$, SnO, $SnO_2$, PbO, $PbO_2$, $Sb_2O_3$, $Sb_2O_5$, and $Bi_2O_3$. Some examples of transition metal oxide compositions include $Sc_2O_3$, $TiO_2$, $Cr_2O_3$, $Fe_2O_3$, $Fe_3O_4$, FeO, $Co_2O_3$, $Ni_2O_3$, CuO, $Cu_2O$, ZnO, $Y_2O_3$, $ZrO_2$, $NbO_2$, $Nb_2O_5$, $RuO_2$, PdO, $Ag_2O$, CdO, $HfO_2$, $Ta_2O_5$, $WO_2$, and $PtO_2$. Some examples of lanthanide metal oxide composition include $La_2O_3$, $Ce_2O_3$, and $CeO_2$. In some embodiments, any one or more classes or specific types of the foregoing metal oxides are excluded from the polymer blend.

A halogen-containing polymer, which may also function as a modifying agent, may or may not be present in the polymer blend material. The halogen-containing polymer, if present in the polymer blend material, can have the halogen atoms bound to aliphatic (i.e., non-aromatic, e.g., alkyl or alkenyl) or aromatic groups, as described above for a hydroxy-containing polymer. The halogen atoms can be, for example, fluorine, chlorine, and bromine atoms. Some examples of fluorinated polymers include poly(vinyl fluoride), poly(vinylidene fluoride), poly(tetrafluoroethylene), fluorinated ethylene-propylene copolymer, poly(ethylenetetrafluoroethylene), poly(perfluorosulfonic acid), and fluoroelastomers. Some examples of chlorinated polymers include poly(vinyl chloride), polyvinylidene chloride, ethylene-chlorotrifluoroethylene copolymer, polychloroprene, halogenated butyl rubbers, chlorinated polyethylene, chlorosulfonated polyethylene, chlorinated polypropylene, chlorinated ethylene-propylene copolymer, and chlorinated polyvinyl chloride. Some examples of brominated polymers include poly(vinyl bromide), and brominated flame retardants known in the art, such as brominated epoxy, poly(brominated acrylate), brominated polycarbonate, and brominated polyols.

The polymer blend material preferably possesses a tensile yield stress (or "yield stress" or "tensile yield strength") of at least or above 5 MPa. In different embodiments, the tensile yield stress is at least or above 5 MPa, 8 MPa, 10 MPa, 12 MPa, 15 MPa, 20 MPa, 25 MPa, 30 MPa, 40 MPa, 50 MPa, 60 MPa, 70 MPa, 80 MPa, 90 MPa, or 100 MPa, or a yield stress within a range bounded by any two of the foregoing exemplary values. As understood in the art, the term "tensile yield strength" or "yield stress" refers to the stress maxima in the stress-strain curve experienced by the polymer during tensile deformation just after the linear elastic region; polymers deformed beyond the yield stress usually show permanent deformation. Beyond the "tensile yield stress" point in the stress-strain profile of the polymer, the stress experienced by the polymer during stretching may remain less than that of the yield stress. Thus, "tensile strength" that is defined at the stress experienced by polymer at fracture or failure point can be lower than the yield strength. In some polymers, the tensile stress experienced at failure is significantly higher than that of the yield stress. In such cases, the stress-strain curve shows a rise (sometimes steep rise) in stress with increase in strain due to enhanced molecular orientation along the direction of deformation. Such a phenomenon of increase in the stress at large strain values (as the polymer molecules orient) is known as "strain hardening".

For some of the exemplary yield stress values provided above, the tensile strength (i.e., the tensile stress experienced at failure) of the polymer blend will be higher according to the known difference in how yield stress and tensile strength are defined. Accordingly, the polymer blend material should possess a tensile strength of above 5 MPa. In different embodiments, the polymer blend material may exhibit a tensile strength of at least or above, for example, 6 MPa, 8 MPa, 10 MPa, 12 MPa, 15 MPa, 20 MPa, 25 MPa, 30 MPa, 35 MPa, 40 MPa, 45 MPa, 50 MPa, 60 MPa, 70 MPa, 80 MPa, 90 MPa, 100 MPa, 200 MPa, 300 MPa, 400 MPa, 500 MPa, 600 MPa, 700 MPa, 800 MPa, 900 MPa, or 1000 MPa, or a tensile strength within a range bounded by any two of the foregoing exemplary values. In some embodiments, the polymer composition does not show strain hardening; it fails at a stress below the yield stress while stretching. Any of the above tensile yield strengths can be exhibited while at an elongation or strain of at least or above 0.1%, 0.2%, 0.5%, 1, 10%, 20%, or 50%. The strain corresponding to the yield stress is called "yield strain". In other embodiments, the polymer blend material does not show a prominent yield stress.

The polymer blend material preferably possesses an ultimate elongation of at least or above the yield strain. In some embodiments, the polymer blend material preferably possesses an ultimate elongation of at least or above 50%. In different embodiments, the polymer blend material may exhibit an ultimate elongation of at least or above 100%, 110%, 120%, 150%, 180%, 200%, 250%, 300%, 350%, 400%, 450%, or 500%, or an ultimate elongation within a range bounded by any two of the foregoing exemplary values. In some embodiments, the polymer blend material possesses any of the above preferable elongation characteristics along with any of the preferable yield stress or tensile strength characteristics, also provided above. In some embodiments, the polymer blend material exhibits less than 50% ultimate elongation.

In some embodiments, the polymer blend material exhibits a tensile stress of at least or above 5 MPa at 1% elongation. In other embodiments, the polymer blend material exhibits a tensile stress of at least or above 5 MPa at 10% elongation. In other embodiments, the tensile stress at 10% elongation is at least or above 10 MPa. In specific embodiments, the tensile stress at 50% elongation is at least or above 5 MPa, 10 MPa, 15 MPa, 20 MPa, 30 MPa, 40 MPa, or 50 MPa. In some embodiments, the tensile stress at 100% elongation is at least or above 5 MPa, 10 MPa, 15 MPa, 20 MPa, 30 MPa, or 50 MPa. A conventional cross-linked (also known as vulcanized) NBR matrix containing 50 parts per hundred resin lignin may exhibit a tensile strength of only 1.5 MPa, a tensile stress at 100% elongation of 1.3 MPa, and 250% ultimate elongation, and likely no yield stress (Setua DK, et al., *Polymer Composites, Vol.* 21, No. 6, 988-995, 2000). Compared to these results, compositions shown in the instant disclosure show dramatically improved mechanical properties.

In particular embodiments, the polymer blend material possesses a yield stress of at least or above 10 MPa, 15 MPa, 20 MPa, 25 MPa, 30 MPa, 40 MPa, or 50 MPa along with an ultimate elongation of at least or above 50%, 100%, 150%, 180%, 200%, 250%, or 300%. Moreover, in some embodiments, the polymer blend material exhibits strain hardening during mechanical deformation, such as during stretching beyond yield strain to ultimate failure.

In some embodiments, the polymer blend further includes an electrically conducting material, which can be referred to as component (iii). The electrically conducting material is typically present in an amount of up to or less than 30, 25, 20, 15, 10, 5, 4, 3, 2, or 1 wt % by weight of components (i), (ii), and (iii). In a first embodiment, the electrically conducting material is included within the polymer blend containing components (i) and (ii), as described above. In the latter case, the electrically conducting material is substantially homogeneously dispersed in the blend, i.e., the polymer blend is a blend containing, at minimum, a blend of components (i), (ii), and (iii). In a second embodiment, the electrically conducting material resides as a coating on a surface of an object composed of a polymer blend containing, at minimum, components (i) and (ii). In the latter case, the polymer blend within the object may or may not also include the electrically conducting material. That is, the electrically conducting material may be coated on the object without the electrically conducting material being within the blend. Generally, if the object contains the electrically conducting material within the blend, the object is not also coated with the electrically conducting material. Nevertheless, the present disclosure considers this possibility.

The electrically conducting material is generally in the form of particles, such as nanoparticles (e.g., 1-200 nm in size) or microparticles (e.g., 200 nm to 100 microns in size). The electrically conducting material can be composed of any of the highly electrically conducting materials known in the art.

In a first embodiment, the electrically conducting material is in the form of particles having a zerovalent metal composition. Some examples of zerovalent metals include, for example, silver (Ag), gold (Au), cobalt (Co), rhodium (Rh), iridium (Ir), nickel (Ni), palladium (Pd), platinum (Pt), copper (Cu), cadmium (Cd), aluminum (Al), and tin (Sn). The zerovalent metal particles may contain a single zerovalent metal, or may contain two or more zerovalent elements. In the case of two zerovalent metals, they may be present in the particle in a homogeneous manner (i.e., as an alloy), or in a heterogeneous manner, such as a core-shell arrangement. Particles of such elements are well known in the art. In a second embodiment, the electrically conducting material is in the form of electrically conducting particles, typically nanoparticles, of carbon. The conductive carbon particles may be, for example, any of the conductive carbon particles described above and as known in the art.

In another aspect, the present disclosure is directed to methods for producing the polymer blend material described above. In the method, at least (or only) the components (i)

and (ii) are mixed and homogeneously blended to form the polymer blend material. If an electrically conducting material is to be incorporated within the blend, the electrically conducting material may also be mixed with components (i) and (ii) and all three components homogeneously blended. Any one of the components can be included in liquid form (if applicable), in solution form, suspension form, or in particulate or granular form. In the case of particles, the particles may be, independently, nanoparticles (e.g., at least 1, 2, 5, or 10 nm, and up to 20, 50, 100, 200, or 500 nm), microparticles (e.g., at least 1, 2, 5, or 10 µm, and up to 20, 50, 100, 200, or 500 µm), or macroparticles (e.g., above 500 µm, or at least or up to 1, 2, 5, 25, 50, 100, 500, or 1000 mm). Typically, if a polymeric component is provided in particle or granular form, the particles are melted or softened by appropriate heating to permit homogeneous blending and uniform dispersion of the components. The components can be homogeneously blended by any of the methodologies known in the art for achieving homogeneous blends of solid, semi-solid, gel, paste, or liquid mixtures. Some examples of applicable blending processes include simple or high speed mixing, compounding, extrusion, or ball mixing, all of which are well-known in the art. In some embodiments, the acrylonitrile-containing rubbers are in solid bale form and those could be cut into usable chunks using standard bale cutting tools. Those chunks of different sizes are mixed or blended with other component(s) in an internal mixer (such as Banbury mixer). In other embodiments, the acrylonitrile-containing rubbers are in latex form and those are mixed or blended with component(s) in a ball mill. In some other embodiments, the acrylonitrile-containing rubbers are in sheet form and the components are mixed in a two-roll mill.

By being "homogeneously blended" is meant that, in macro (e.g., millimeter) scale, no discernible regions of at least components (i) and (ii) exist. If a modifying agent, as discussed above, is included, all or a portion of the modifying agent may or may not remain in the solid (unmelted) phase, e.g., either in elemental state (e.g., carbon particles) or in crystalline lamella phase (e.g., polyethylene oxide). In other words, the homogeneous blend may possess a modified or compatibilized phase structure (not necessarily a single phase structure, but often with retained but shifted $T_g$ associated with individual phases) for at least components (i) and (ii). The modified-phase structure generally indicates near homogeneous integration at microscale or near the molecular level without losing each component's identity. In the case of an additional non-homogeneous component, the instantly described polymer blend including components (i) and (ii) can be viewed as a "homogeneous matrix" in which the additional non-homogeneous component is incorporated. Preferably, all of the components retain their identity and components are well dispersed in the nanometer scale.

In some embodiments, the mixture being blended further includes a crosslinking (or curing) agent, which may be a radical or physical crosslinking agent. A particular example of a physical crosslinking or curing agent is sulfur. The radical crosslinking agent is any substance that produces radicals to effect crosslinking of component (i) and/or (ii) either during the blending process and/or subsequently during a conditioning process, activation process, curing process, and/or shape-forming process. The radical crosslinking agent may decompose under thermal or radiative exposure to form reactive radicals. The radical crosslinking agent may be, for example, any of the radical polymerization initiators known in the art. In particular embodiments, the radical crosslinking agent is an organic peroxide compound. Some examples of organic peroxide compounds include dicumyl peroxide (DCP), t-butyl peroxide, benzoyl peroxide, methyl ethyl ketone peroxide, and acetone peroxide. The radical crosslinking agent may alternatively be an inorganic peroxide compound, such as a peroxydisulfate salt. The radical crosslinking agent may or may not also be selected from non-peroxide radical-producing compounds, such as azo compounds (e.g., AIBN or ABCN), or a halogen (e.g., $Br_2$ or $I_2$). In some embodiments, radical crosslinking may be achieved by physical means, such as by exposure of the material to electron beam (e.g., Stelescu et al., *The Scientific World Journal*, 684047, 2014) or ultraviolet (UV) radiation (e.g., Naskar et al., *Carbon*, 43(5) 1065-1072, 2005) that generates free radicals for crosslinking of the components. Hydrocarbon polymers generate free radicals by exposure to electron beam radiation. In some embodiments, to facilitate UV crosslinking, the polymer blend may be further modified with acrylates and/or conjugated ketones (benzophenone derivatives) additives that generate free radicals when exposed to UV radiation. In other embodiments, any one or more specific types or general class of crosslinking or curing agents are excluded from the preparation process.

The process for preparing the polymer blend material can employ any of the weight percentages (i.e., wt %) of components provided in the earlier description of the polymer blend material. Moreover, during the process (i.e., during blending), certain ranges in processing temperature (i.e., during blending), shear rate, and processing time (i.e., duration of blending at a particular temperature) may be selected to produce a polymer blend material having particularly desirable physical characteristics. With respect to processing temperature, the blending process is generally conducted at a temperature of at least or above 100° C. and up to or less than 200° C., which may be a temperature of about, for example, 100° C., 110° C., 120° C., 130° C., 140° C., 150° C., 160° C., 170° C., 180° C., 190° C., or 200° C., or a temperature within a range bounded by any two of the foregoing values. With respect to the shear rate (which is related to the mixing speed in rpm), the blending process is generally conducted at a shear rate of at least or above 10 s$^{-1}$ and up to or less than 1000 s$^{-1}$, which may be a shear rate of about, for example, 10, 20, 30, 40, 50, 100, 150, 200, 250, 300, 350, 400, 500, 600, 700, 800, 900, or 1000 s$^{-1}$, or a shear rate within a range bounded by any two of the foregoing values. The mixing rate (in rpm) corresponding to the foregoing shear rate range is approximately 1-150 revolutions of the blades per minute. With respect to processing time, the blending process preferably employs a processing time (time during blending at a particular temperature and shear rate) of at least or above 5 minutes and up to or less than 45 minutes, which may be a processing time of about or at least, for example, 10, 15, 20, 30, 45, 60 minutes, or a time within a range bounded by any two of the foregoing values.

The polymer blend material is typically subjected to a shape-forming process to produce a desired shape of the polymer blend. The shape-forming process can include, for example, extrusion molding, injection molding, compression molding, melt pressing, or stamping, all of which are well known in the art. In other embodiments, the polymer blend material is used in a printing process to form a shape containing the polymer blend material, wherein the printing process can be, for example, a rapid prototyping (RP) process known in the art, such as a fused deposition modeling (FDM) or fused filament fabrication (FFF) process known in the art, which may also be collectively considered as 3D printing processes.

In another aspect, the present disclosure is directed to a method of thermal-activated reversible mechanical deformation of an object having the above-described shape memory characteristic. In the method, the object possesses a first (i.e., original) shape at a temperature below the glass transition temperature ($T_g$) of the object. The temperature below $T_g$ is typically ambient (i.e., room) temperature. Room (ambient) temperature is generally understood to be a temperature within a range of 15-30° C., or more particularly, 20-25° C., or about 20° C. or 25° C. The $T_g$ of the object (i.e., of the blend described herein) may be about or at least, for example, 10, 25, 30, 35, 40, 45, 50, 55, 60, 65, 70, 75, 80, 85, 90, 95, 100° C., or a $T_g$ within a range bounded by any two of the foregoing values.

In a first step (i.e., step (i)), the object having an original shape at a temperature below $T_g$ is raised in temperature to a first temperature, which is a temperature at or above the glass transition temperature of the object. When the object is raised to the first temperature, a stress is applied on the object to deform the object. The object at the first temperature is thus in a deformed state (i.e., has a different shape) relative to the original shape. In the case where the first temperature is above $T_g$, the first temperature remains below the melting point of the object (i.e., below the melting point of the blend of which the object is composed). The first temperature may be, for example, at least or no more than 5, 10, 15, 20, 25, 30, 40, or 50° C. above the $T_g$, provided the first temperature is below the melting point of the blend.

In a second step (i.e., step (ii)), the object in the deformed state at the first temperature is cooled to a second temperature of up to (no more than) or less than 0° C., while in the deformed state and while under the same applied stress mentioned above. The foregoing step functions to fix (i.e., program) the object to remain in the deformed state even when the applied stress is removed. Indeed, the second step includes removing the applied stress while at the second temperature with the object remaining in the deformed state. In some embodiments, the second temperature is no more than or less than −5, −10, 15, −20, −25, −30, −35, or −40° C.

In a third step (i.e., step (iii)), the object in the deformed state and not under an applied stress, is made to revert to its original shape by raising the temperature of the object to the first temperature. Thus, by raising the temperature of the object to the first temperature, the original shape of the object is recovered. This final step evidences a shape memory characteristic of the blend material. Moreover, after step (iii), the object possesses the ability to reversibly interconvert between the deformed and original shapes by being alternately subjected to fixing of the deformed state of the object according to step (ii) and recovering the original shape of the object according to step (iii).

In some embodiments, the thermal-activated reversible mechanical deformation is practiced on an object containing components (i) and (ii), but not an electrically conducting component (iii). In such embodiments, the shape memory object can be used in a host of applications where shape memory can play an important role. Some applications include, for example, sensors, actuators, artificial muscles, drug delivery systems, surgical and medical devices, self-healing structures, morphing structures, energy transfer devices, and self-assembling devices.

In other embodiments, the thermal-activated reversible mechanical deformation is practiced on an object containing components (i), (ii), and (iii). As discussed above, the electrically conducting material (component iii) may be within the blend (within the object) or as a coating on a surface of an object composed of the blend minimally containing components (i) and (ii) (i.e., wherein the blend containing minimally components (i) and (ii) defines a shape of the object). When the electrically conducting material is included in or on the object, deformation of the object results in a change in the electrical conductivity of the object. Since the object containing component (iii) changes in electrical conductivity with change in shape (which changes with temperature), the object can be used as a stress sensor, strain sensor, or electrical switch.

Examples have been set forth below for the purpose of illustration and to describe certain specific embodiments of the invention. However, the scope of this invention is not to be in any way limited by the examples set forth herein.

EXAMPLES

Synthesis and Analysis of an Acrylonitrile-Butadiene Polymer Blend

Overview

Figure 1A:
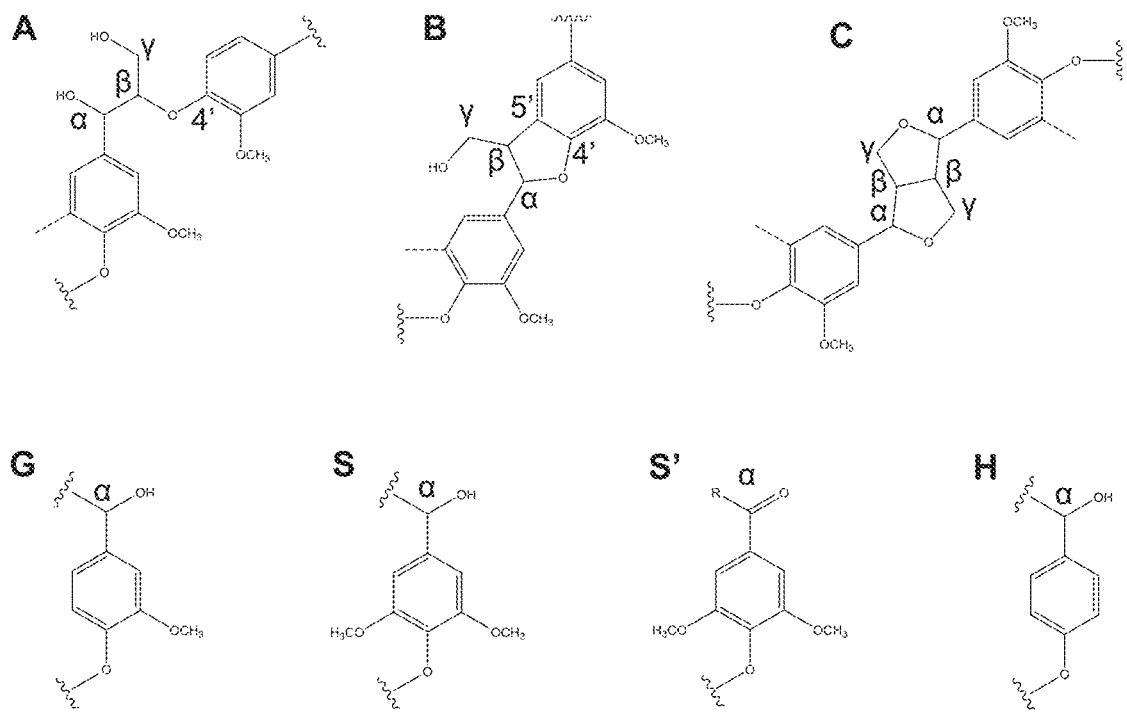
FIGS. 1A-1C.
Figure 1B:
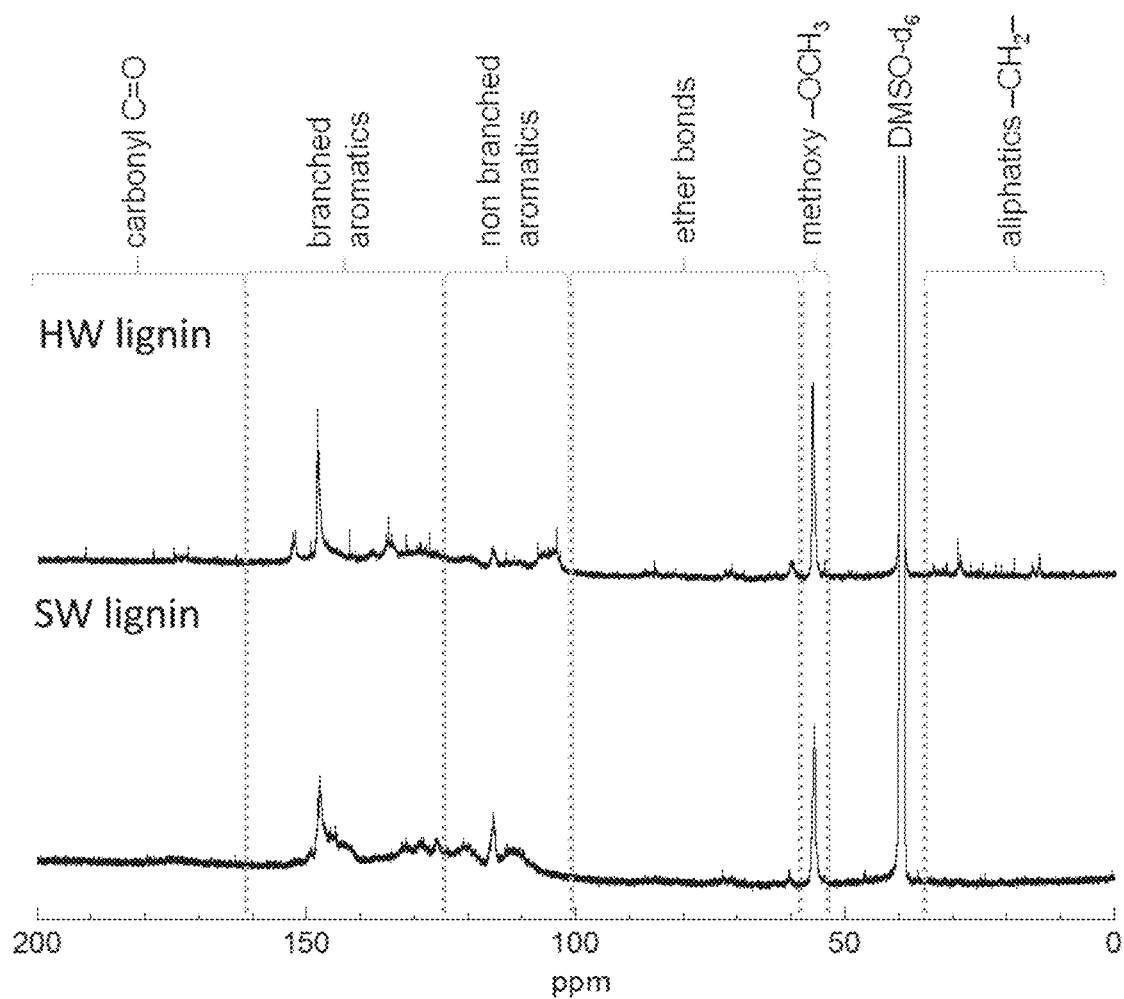
Figure 1C:
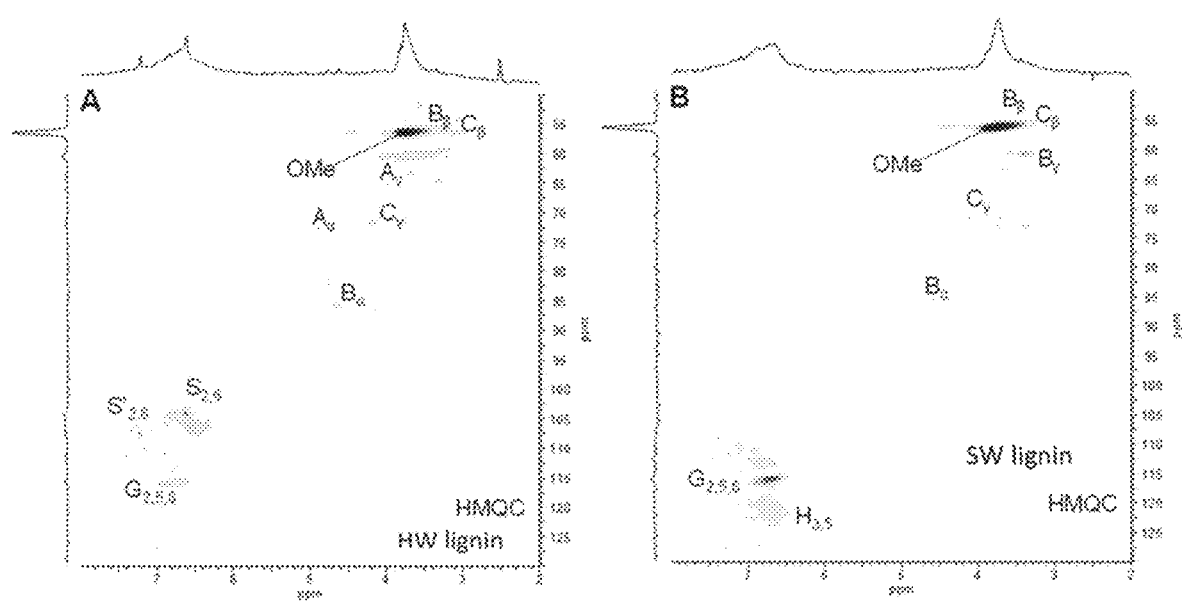

FIG. 1A depicts representative chemical structures of lignins. Lignin is an important component in plants by contributing to the stiffness of plant cell walls, accounting for ca. 15% to 40% dry weight (depending on the plant sources) and is the second most abundant (after cellulose) in plant biomass. It is often isolated as a byproduct from the pulping industry or biorefineries and used as a cheap feedstock for thermal energy recovery through combustion. The representative chemical structures of lignins used in these experiments were determined by $^{13}$C nuclear magnetic resonance (NMR) and two-dimensional (2D) $^1$H-$^{13}$C heteronuclear multiple quantum coherence (HMQC) NMR spectroscopy. The measured $^{13}$C NMR spectra and 2D-NMR HMQC spectroscopy data are presented in FIGS. 1B and 1C. HW lignin contained significant β-O-4' linkages (substructure A, shown in FIG. 1A), while this linkage was not detected in SW lignin. Both lignins contained β-5' and β-β linkages (substructure B and C, respectively, in FIG. 1A). The measured data indicate that the guaiacylpropane unit (substructure G in FIG. 1A) is predominant in SW lignin, and is also present at lower concentrations in HW lignin. Additionally, the syringyl propane units (substructures S and S' in FIG. 1A) were detected within HW lignin at concentrations higher than 'G' but were not observed in SW lignin, while p-hydroxyphenolpropane units (substructure H) were observed within SW lignin but not in HW lignin. In summary, HW contains a higher concentration of β-O-4' and 'G' units, with no 'H'; SW contains a higher concentration of 'G' and 'H' with no observed β-O-4' linkages. The structure of the lignin used in the ABL formulation is significant in terms of its interaction with the nitrile rubber and the resulting shape-recovery effects.

The ability of a polymeric material to recover a permanent shape from a temporarily fixed deformation can be regulated by the chemical- and/or physical-crosslinking density of polymer molecular segments. After a polymeric material is deformed, it is stabilized by being quenched to a certain fixed temperature. Dynamic non-covalent bonds (such as hydrogen bonds) have been found to play a critical role in stabilizing the programmed (temporary) shape. Acrylonitrile-butadiene rubber (41 mol % nitrile content) (NBR41) possesses a good recoverable strain property after deformation. The elastic recovery of nitrile rubber arises from intermolecular crosslinking of nitrile groups during thermal processing (e.g., U.S. Pat. No. 4,885,096). However, a low glass transition temperature (−16.5° C.) of pristine NBR41 results in very low shape fixity (i.e., an inability to retain the deformed shape). In this study, lignin was used to enhance the glass transition temperatures ($T_g$) and the potential to store mechanical work through deformation that in turn improves shape fixity.

Synthesis

Acrylonitrile-butadiene rubber 41 (41 mol % nitrile content) and Organosolv hardwood and Kraft softwood were obtained commercially. Various softwood and hardwood lignin fractions, from 40 wt % to 60 wt %, were melt-mixed with the nitrile butadiene rubber (NBR-41) using a Brabender Plastic Corder equipped with a half-size (30 cc) mixing chamber and high shear twin roller blades. The rubber was loaded and mixed in the mixing chamber for two minutes at 90 rpm and 180° C. Lignin was then added, and mixing was continued with high shear mixing and reacting for a total of 60 minutes. After mixing, the samples were recovered and stored at room temperature for analysis. The lignin—NBR41 composite films were prepared by molding between two Teflon sheets at 190° C. for 20 minutes by use of a hydraulic press machine.

Shape Memory Characterization

Samples of pristine NBR41, SW- and HW-NBR41 with dimensions (3-5 mm×2 mm×50 mm) (W×T×L) were prepared for shape memory experiments. Three weight fractions, 40%, 50%, and 60%, of SW and HW lignins in NBR41 were characterized. The DMA—Q800 (TA instruments) was utilized to investigate the shape memory characteristics of these samples. The axial tension geometry was used. All measurements were conducted in a nitrogen atmosphere. The shape programming and recovery were investigated by deforming the materials at selected strain amplitudes, including 20%, 50%, and 100%. Also, two different programming temperatures, 50° C. and 100° C., were selected. The sample was loaded and attached on axial tension geometries at ambient temperature. After closing the oven chamber, the sample was purged with nitrogen and the temperature was ramped at 10° C./min to the tested temperature (50° C. or 100° C.). An isothermal step for two minutes was applied to equilibrate the sample before stretching to a desired strain amplitude. To fix (program) the temporary shape, the temperature was quickly cooled to −30° C. at a rate of 50° C./min. The applying force was released to a minimum value (0.001 N) before increasing the temperature back to the deforming temperature for recovering. An isothermal stage for 30 minutes at this temperature was applied for further recovering. The whole process of deforming, fixing, and recovering was repeated three times. The stress and modulus induced from deforming were measured as well. Repeatable shape recovery and fixity after three times of programming with very high strain amplitudes were determined and quantified. To visualize the programmable and recoverable shape properties, selected samples were manually stretched on a pre-heated hotplate then fixed by placing the sample on an aluminum-ice surface (i.e., a cup containing ice with aluminum foil covering the ice surface). The programmed (temporary) shapes were put on the pre-heated hotplate again to observe the recovery process. Recovery of the programmed shapes were recorded.

Figure 2A:
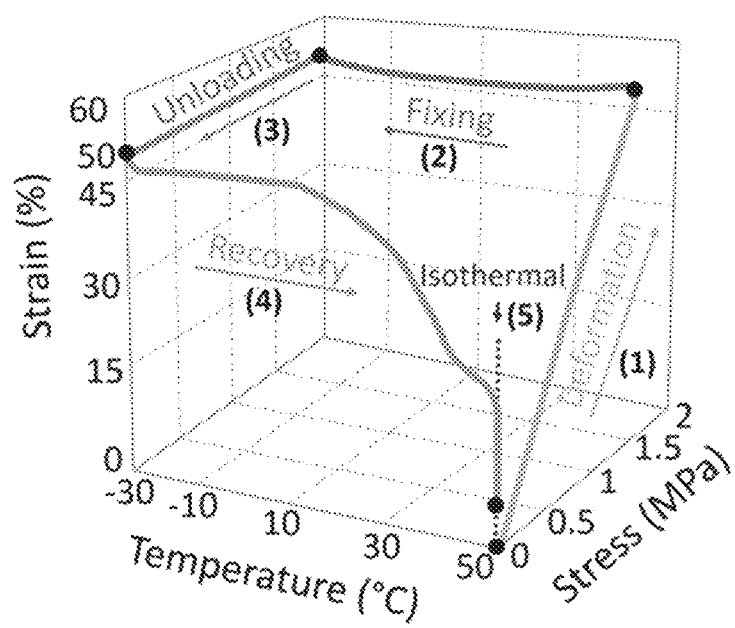
FIGS. 2A-2C. Principles of programming the shape-memory effect and tunable electrical conductivity in acrylonitrile-butadiene-lignin (ABL) composites.
Figure 2B:
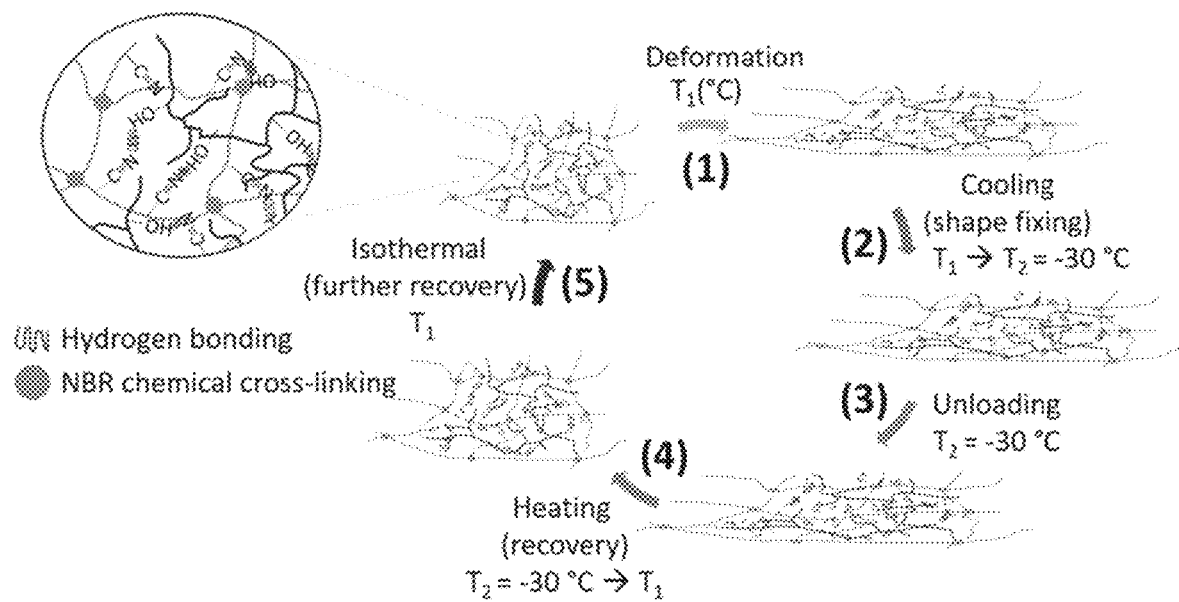

FIG. 2A is a graph that represents a typical cycle of deformation, fixing, and recovery for an ABL sample. The whole process and the associated deformation in networked structures are illustrated in FIG. 2B. Deformation of the networks in the ABL composite involves hydrogen bonds between the hydroxyl (—OH) groups of lignin molecules and the nitrile (—C≡N) groups of NBR41. The exceptional shape recovery and fixity of ABL was further employed to control the electrical conductivity for sensor applications.

Figure 2C:
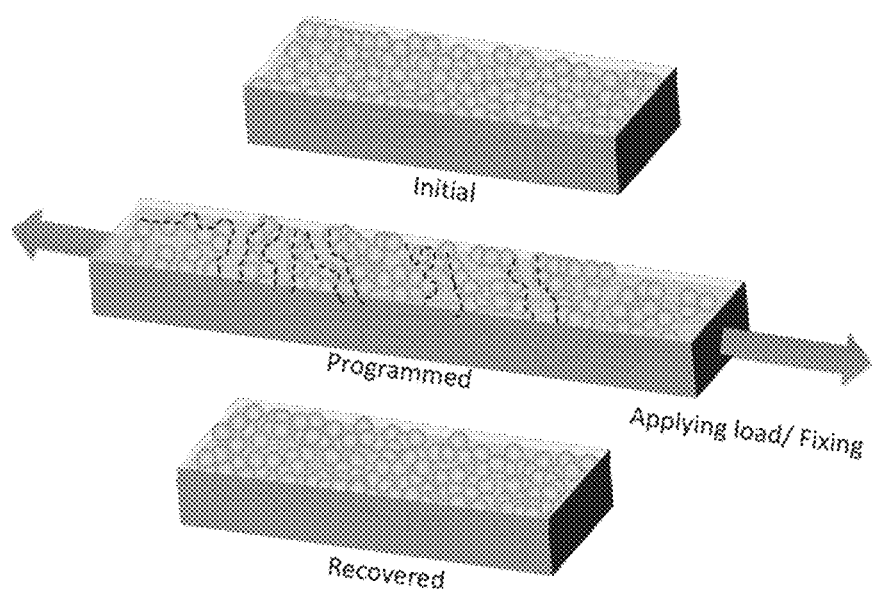

FIG. 2C illustrates a method of programming the conductivity of the material by coating a layer of electrically conductive particles (e.g., Ag nanoparticles) on the shape-memory substrate. When the composite film was stretched, percolation and interconnections between the electrically conductive nanoparticles were decreased and broken, as illustrated by the dashed lines. Thus, electrical conductivity was substantially diminished or absent in the stretched material.

Thermomechanical Characteristics of ABL and its Networked Structure

Figure 3A:
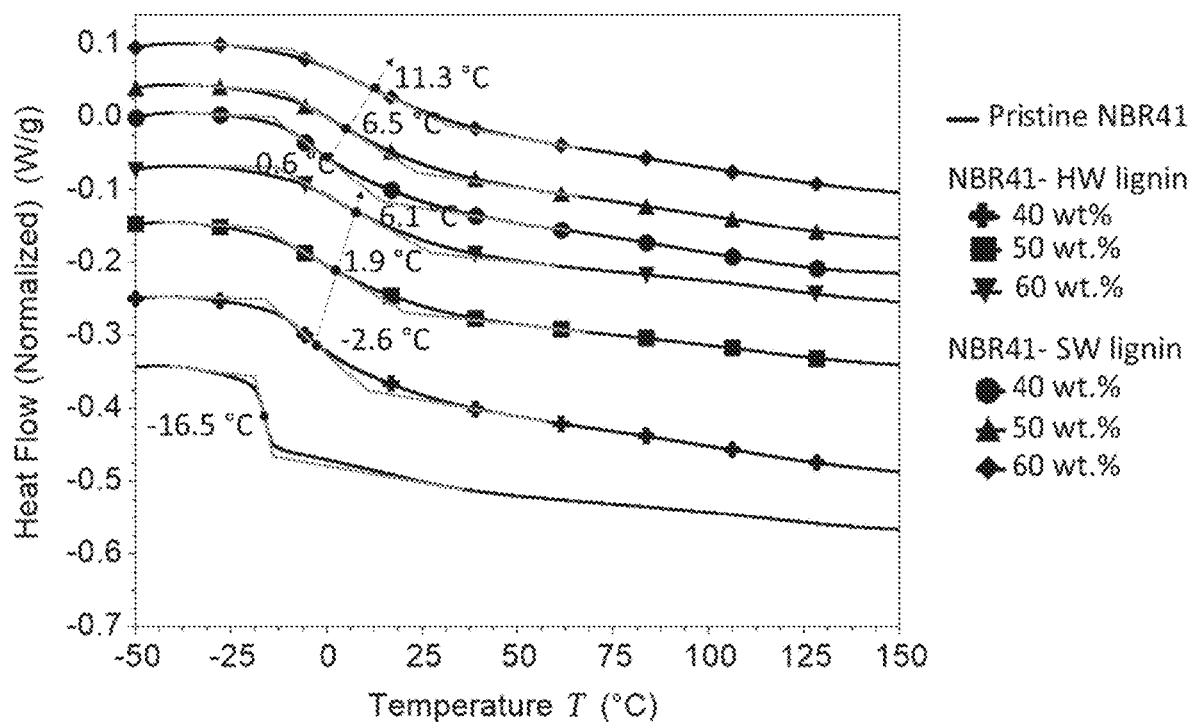
FIGS. 3A-3F. Characteristics of ABL compositions.

The characteristics of the ABL materials were first investigated. The results of differential scanning calorimetry (DSC), as shown in FIG. 3A (vertically shifted for clear observation), evidenced a very low glass transition temperature (−16.5° C.) for pristine NBR41 and an increase in $T_g$ by adding hardwood (HW) or softwood (SW) lignins at selected fractions. The degree of elevation in $T_g$s with respect to the pristine rubber was higher in SW-lignin-based ABL compositions. For example, the $T_g$ was elevated from 17.1° C. to 27.8° C. in SW-lignin-based ABL composites for corresponding increases in lignin content from 40 wt % to 60 wt %; the elevation of $T_g$ of HW-lignin-based ABL was 22.6° C. for a 60 wt % HW-lignin loading in NBR41. The well-known Flory-Fox equation was used for the thermal analysis. The results suggest that chemical crosslinks were created between lignin and NBR41. The 2D-NMR spectroscopy data of the two lignins revealed the predominance of guaiacylpropane units (substructure G) and p-hydroxyphenolpropane units (H) in SW-lignin, whereas the HW-lignin possesses fewer G units and no H units. The non-condensed G and H units indicate higher chemical reactivity and less steric hindrance around the phenolic hydroxyl group. The higher reactivity and reduced hindrance promote potential crosslinking reactions and the formation of hydrogen bonds between lignins and NBR41 under high-temperature shear mixing.

Unsaturated rubbers are known to create free radicals during thermal shear. The presence of double bonds (C=C), a symmetric stretch at ca. 1650 cm$^{-1}$ within the nitrile butadiene rubber, promotes the chemical crosslinks with free radicals generated by thermally unstable linkages of lignin structural units. Since both SW and HW lignin have significant G substructure, they are expected to form chemical bonds. In addition, the thermally unstable linkages in HW lignin, such as β-O-4' bonds and abundant methoxy (—OCH$_3$) groups, are susceptible to form free radicals during high shear mixing cycles.

To investigate the molecular interactions of the ABL composites, frequency dependent rheological measurements at elevated temperatures were performed. The results, as provided in the graphs in FIGS. 3B and 3C, suggest that the dynamic shear storage modulus (G') and the complex viscosity (η) of the pristine NBR41 are altered by the addition of various HW and SW lignin fractions. The ABL with SW-lignin-NBR41 composition exhibited strong improvement of G' at a reference temperature of 190° C. in comparison with neat NBR41. A large region of frequency-independent G' (a plateau region) was observed in the SW-lignin-based ABL composites, from 100 rad/s to a very low frequency (terminal region), 10$^{-3}$ rad/s, which indicates the formation of a crosslinked structure. The increase in G' of the SW-lignin-based ABL may be induced by the presence of the very rigid SW-lignin structure. Several orders of magnitude higher storage modulus of the pristine SW-lignin at 190° C. as compared to that of pristine HW-lignin confirms higher rigidity of the former than the latter.

Figure 3B:
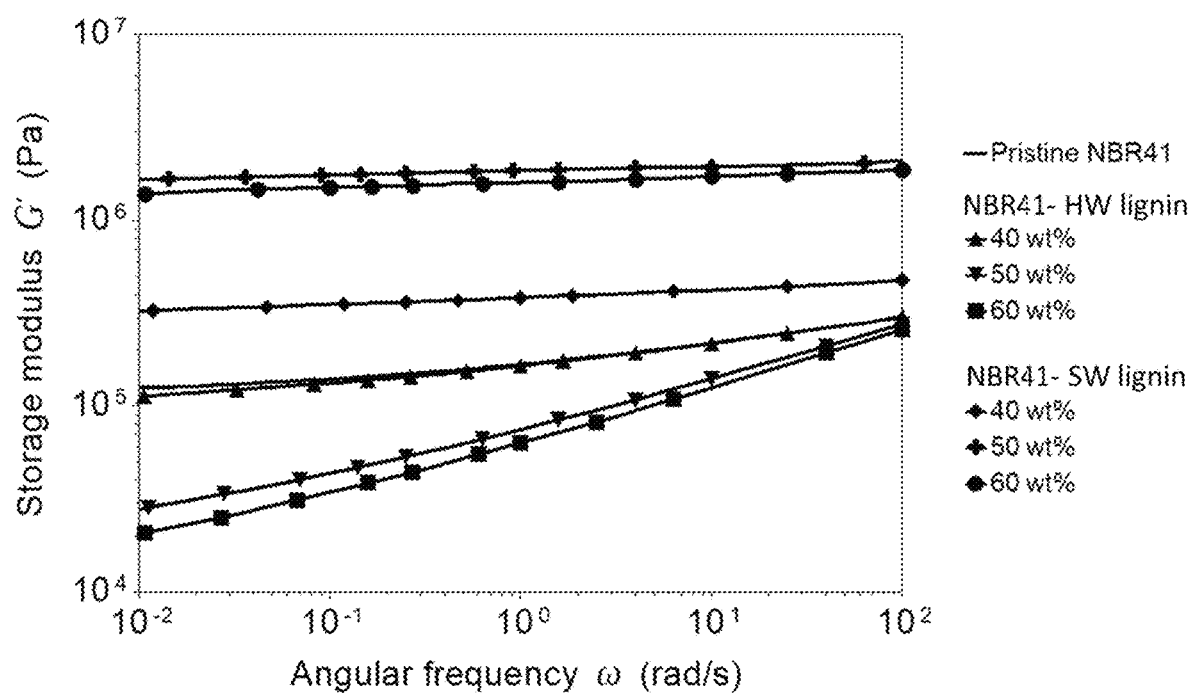
Figure 3C:
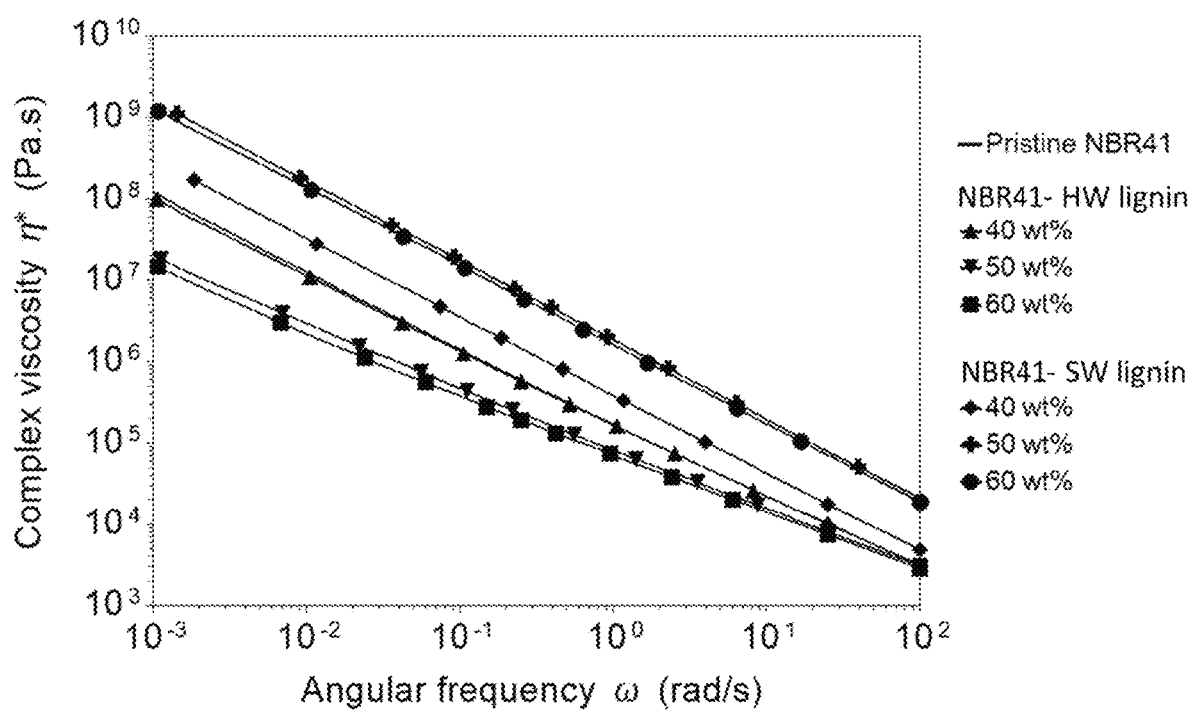

Evidently, the HW-lignin-based ABL composition shows a considerable decrease in G' of the NBR41 matrix at the low frequency. The drop in G' of the NBR41 matrix after incorporation of HW lignin becomes very significant at high lignin content. As indicated in FIG. 3B, the slopes of G' versus angular frequency in the terminal region of pristine NBR41 and the SW-based ABL approach zero, whereas the slopes are slightly higher for the HW-based ABL. This measured data suggests less intermolecular interaction occurs within the HW-based ABL in comparison to the others. Similarly, the comparison of a complex viscosity profile with angular frequency in FIG. 3C also indicates a lower degree of crosslink density and poorer intermolecular interaction in HW-based ABL than in the pristine NBR41 or the SW-based ABL. Again, the complex viscosity of ABL is strongly dependent on the lignin content and the nature of the lignin. It was also found herein that the melt viscosity of HW- and SW-lignin segments contributed significantly to the complex viscosity of the ABL composites. Moreover, the data in FIG. 3C exhibit no zero-shear viscosity, which evidences prevalence of a crosslinked or networked structure in the compositions.

The evidence indicates both physically and chemically networked structures. The physical crosslinks appear to be formed by hydrogen bonds within lignin and nitrile rubber molecules, while the chemical crosslinks appear to be the result of intrinsic networked structures of lignins along with entanglements and other thermally formed networks in nitrile rubber. The degree of chemical crosslinking between rubber and the lignin is apparently low; otherwise, its molding and thermal reprocessing, including rheological study of the molded specimens, would have been very difficult. Nonetheless, the formation of a slightly networked structure between the lignin and rubber was studied using swelling of the alloys in solvents (Bova, T. et al. *Green Chemistry* 2016, 18 (20), 5423-5437). It is noticed that the storage modulus and the complex viscosity of 60 wt % SW-based ABL slightly decreased with respect to the measured data of the 50 wt % SW-based ABL composite. SW lignin is very rigid even at a very high temperature (190° C.), as demonstrated by a very high melt storage modulus (over 30 MPa) and a high complex viscosity (over $4 \times 10^5$ Pa·s). Most likely, a very high lignin loading, 60 wt %, and a high thermal shear (90 rpm) at 180° C. during the mixing could result in depolymerization of rigid SW-lignin. The ABL made with SW lignin was chosen for further work because of its ability to form a rigid networked structure.

Figure 3D:
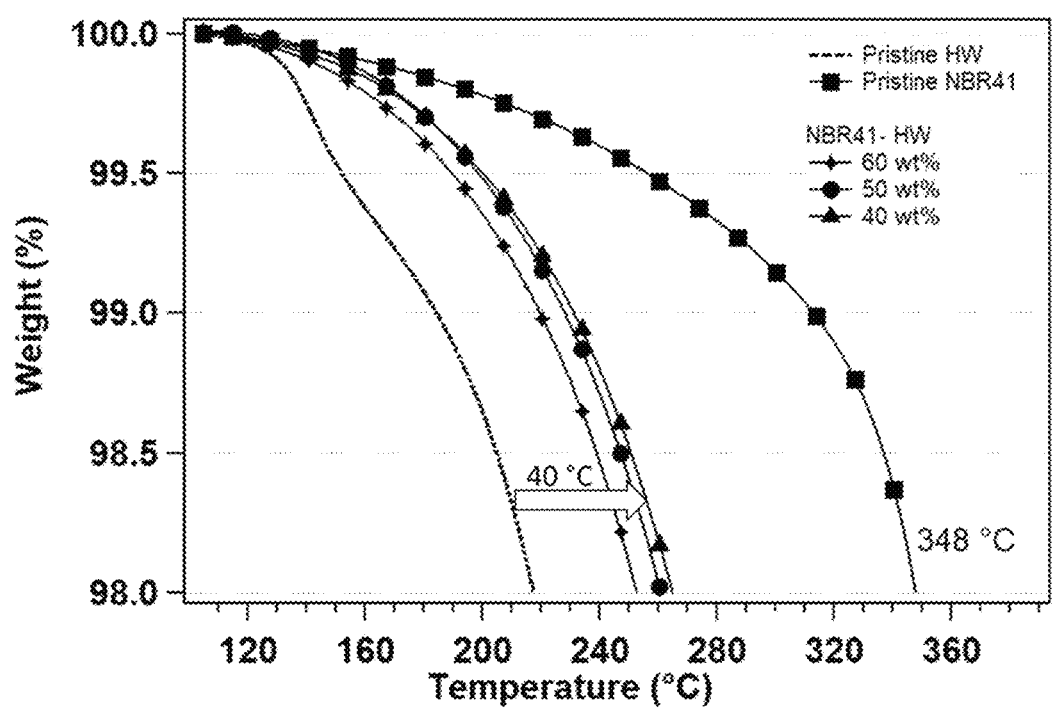
Figure 3E:
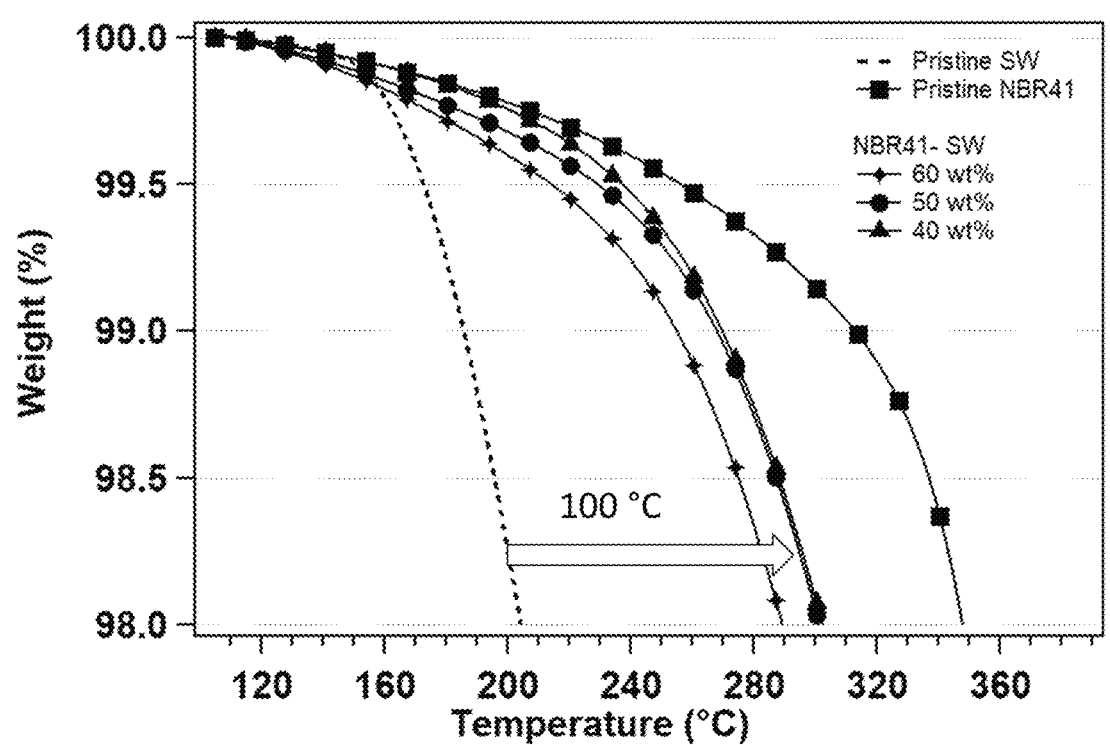

Additionally, the measured results of thermogravimetric analysis (TGA) (see FIGS. 3D and 3E) suggest that the intermolecular interactions of SW lignin with NBR41 (including the possibility of crosslinking and formation of more hydrogen-bonded assemblies) are superior to those of HW lignin with the NBR41. The data in FIGS. 3D and 3E show different thermal stability behaviors of the investigated samples. Pristine NBR41 indicates the highest thermal degradation temperature, whereas both SW and HW lignins revealed very low thermal stability. However, by incorporating these two selected lignins into NBR41, their corresponding composites with NBR41 exhibit very different thermal stability characteristics. Although HW-lignin is thermally more stable than SW-lignin, the TGA thermograms demonstrate that the thermal stability of SW-lignin-based ABL is superior to that of the HW-lignin-based ABL. For example, the temperature associated with fixed mass loss (2 wt. %) is slightly higher for HW lignin (209° C.), than the SW-lignin (204° C.). However, as shown by the data in FIGS. 3D and 3E, after melt-mixing of these lignins with pristine NBR41, the ABL compositions exhibit an increase in temperature associated with 2 wt. % mass loss. This increase in specific degradation temperature is significantly higher for SW-lignin-based ABL (approximately 100° C.) than that of the HW-lignin-based ABL (ca. 40° C.). Most likely, the increase in molecular interactions and chemical crosslinks within the SW-lignin-based ABL resulted in a more stable structure. The higher reactivity of SW lignin with rubber results in a product with a more saturated backbone structure. On the other hand, less reactivity of rubber with HW lignin leaves more unsaturation in the rubber, and thus, more susceptibility to thermal degradation. This analysis further corroborates the rheological data (FIGS. 3B and 3C), in which significant improvement of the storage modulus and flow resistance were determined in the SW lignin composites.

Figure 3F:
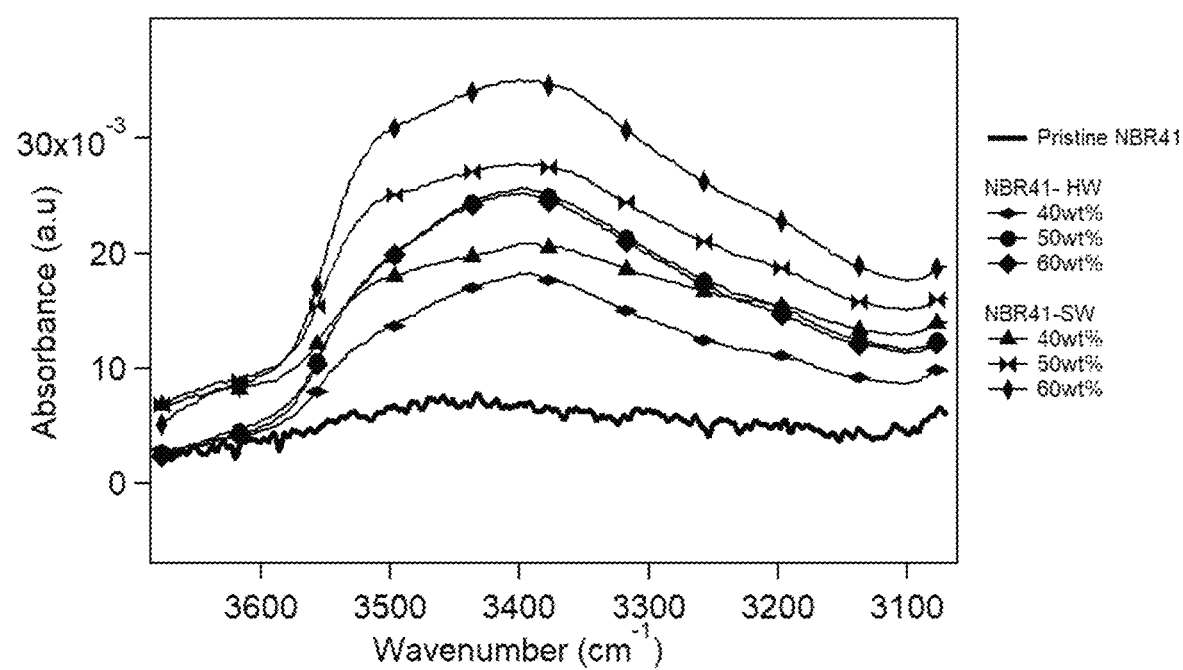

The aliphatic and aromatic hydroxyl groups in SW and HW lignins promote hydrogen bonding with nitrile (—C≡N) groups (denoted by an absorbance peak at around 2,200 $cm^{-1}$) in NBR41. The hydrogen bonds were verified by the appearance of a wide Fourier transform infrared spectroscopy (FTIR) absorbance peak at about 3,300 $cm^{-1}$, as shown in the graph in FIG. 3F (S. Kubo et al., *Biomacromolecules* 2005, 6 (5), 2815-2821). The measured $^{13}$C NMR data indicate similar total number of aliphatic hydroxyl group equivalents determined in SW-lignin and HW-lignin, 47 and 45 (per 100 aromatic unit), respectively. However, as shown by FIG. 3F, the FTIR absorbance peaks at ca. 3300 $cm^{-1}$ exhibit more interactions through hydrogen bonding formed in SW-lignin and within SW lignin-NBR41 composites in comparison to HW lignin and HW lignin-NBR41 samples. The measured $^{13}$C NMR and 2D NMR HMQC results reveal significant domination of a highly branching aromatic structure containing rich β-O-4' linkages (substructure A) and syringyl propane units (substructures S and S') in HW lignin. It is believed that the HW lignin has more steric hindrance effects, which would inhibit the formation of hydrogen bonds.

Shape Memory Characteristics of ABL

Figure 4:
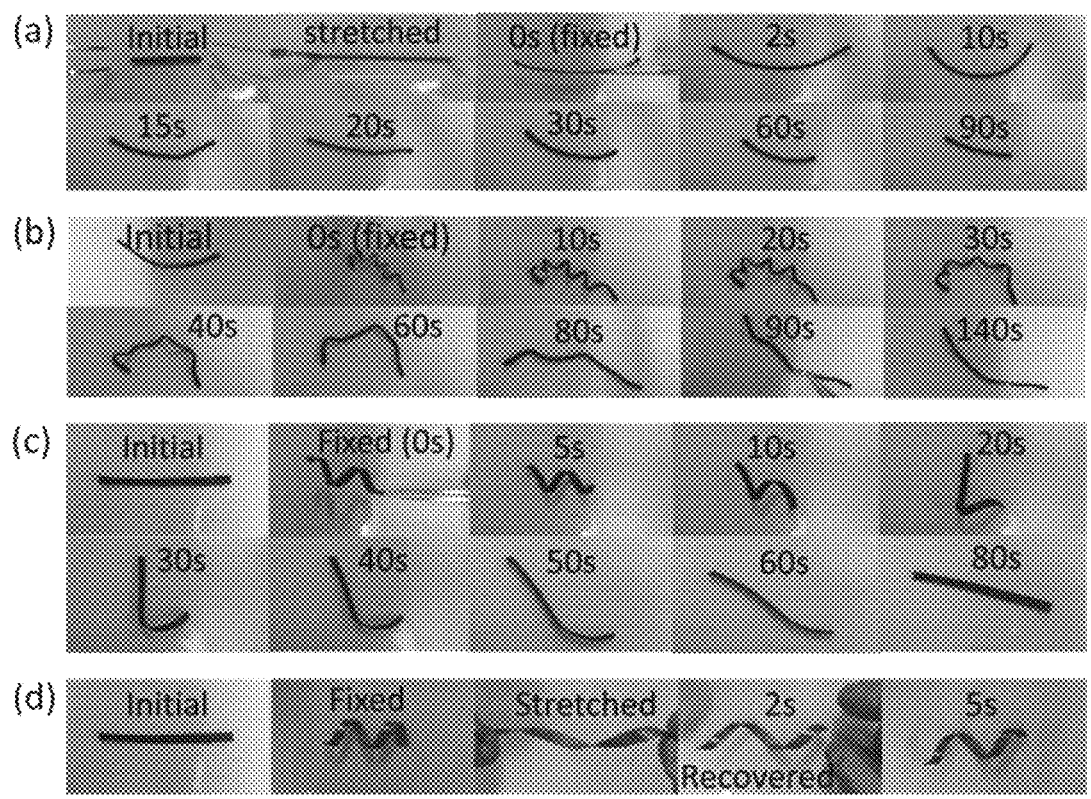
FIG. 4. Selected programmable and recoverable softwood (SW) and hardwood (HW) lignin-NBR41 composites. Row (a): Recoverable shape of HW-lignin-NBR41 (40: 60 wt %) after uniaxial stretching (deforming) at 50° C., cooling to fix, and recovering at 50° C.; Row (b): Recoverable shape of HW-lignin-NBR41 (50: 50 wt %) after deforming/twisting at a high temperature (100° C.), cooling to fix, and recovering at 100° C.; Row (c): Recoverable shape of SW-lignin-NBR41 (50: 50 wt %) after twisting at a high temperature (100° C.), cooling to fix, and recovering at 100° C.; Row (d): Repeated recovery of a fixed/temporary shape of SW-lignin NBR41 (50: 50 wt %) after being deformed at ambient temperature multiple times.

The programmable fixity and recovered shapes of ABLs are illustrated by the digital images shown in FIG. 4. The digital images in FIG. 4 (row a) reveal good recovery characteristics of a 40 wt. % HW-lignin-based ABL. The sample was placed on a pre-heated Teflon sheet (attached to a hotplate surface at 50° C.). After that, it was axially stretched at a very large strain amplitude (see the stretched image, second from left in FIG. 4, row a), then quickly cooled on a chilled aluminum surface to temporarily fix the stretched shape (see the fixed, 0 s image, third from left in FIG. 4, row a). When the fixed sample was placed back on the hotplate at 50° C., the sample was restored to its original shape within 90 seconds. Similarly, two selected ABL compositions with 50 wt % HW lignin and 50 wt % SW lignin (FIG. 4, rows b and c, respectively) also demonstrated the ability to recover their initial shapes after being deformed and programmed at a very high activating temperature (100° C.). The initial shapes were recovered within 100 to 200 s. A 50 wt. % SW-lignin-NBR41 strand was twisted and wrapped on a metallic cylinder that was preheated to 100° C. to get a spring shape and was then fixed on a chilled aluminum surface. The image "Fixed" in FIG. 4, row d is a programmed shape that maintained excellent temporary shape at ambient temperature. The programmed shape was stretched multiple times at ambient conditions.

Every time the applied stretching force was released, the temporary shape recovered in several seconds.

Precise procedures and measurements (as illustrated in FIG. 2A) were conducted to quantify the shape-memory effect for ABL materials containing both HW and SW lignins. The data in FIGS. 5A and 5B show the strain (%) versus time and temperature of pristine NBR and of ABL compositions based on 40 wt. % HW lignin, 40 wt. % SW lignin, and 50 wt. % SW lignin. The time periods displayed in the graphs correspond to three different cycles of deformation, fixity, and recovery. Pristine NBR41, 40 wt. % SW-lignin-based ABL, and 40 wt. % HW-lignin-based ABL samples indicated recoverable strain after being stretched to a very high strain (100% strain at 50° C.) (FIG. 5A).

The strain recovery (R) and fixity (F) were measured by using Eqs. (1) and (2), which are well known (e.g., Li et al., Advanced materials 2007, 19 (19), 2851-2855 and Anthamatten, M. et al., *Macromolecules* 2013, 46 (10), 4230-4234):

$$R = \frac{(\varepsilon_d - \varepsilon_r)}{\varepsilon_d} \quad (1)$$

$$F = \frac{\varepsilon_f}{\varepsilon_d} \quad (2)$$

where, $\varepsilon_d$ is the strain after deformation, $\varepsilon_r$ is the residual strain after the recovery process, and $\varepsilon_f$ is fixed strain at a selected fixed temperature after the applied force is unloaded. The corresponding stress profiles associated with the repeated deformation-fixing-recovery cycles for NBR41 were also found.

Figure 5C:
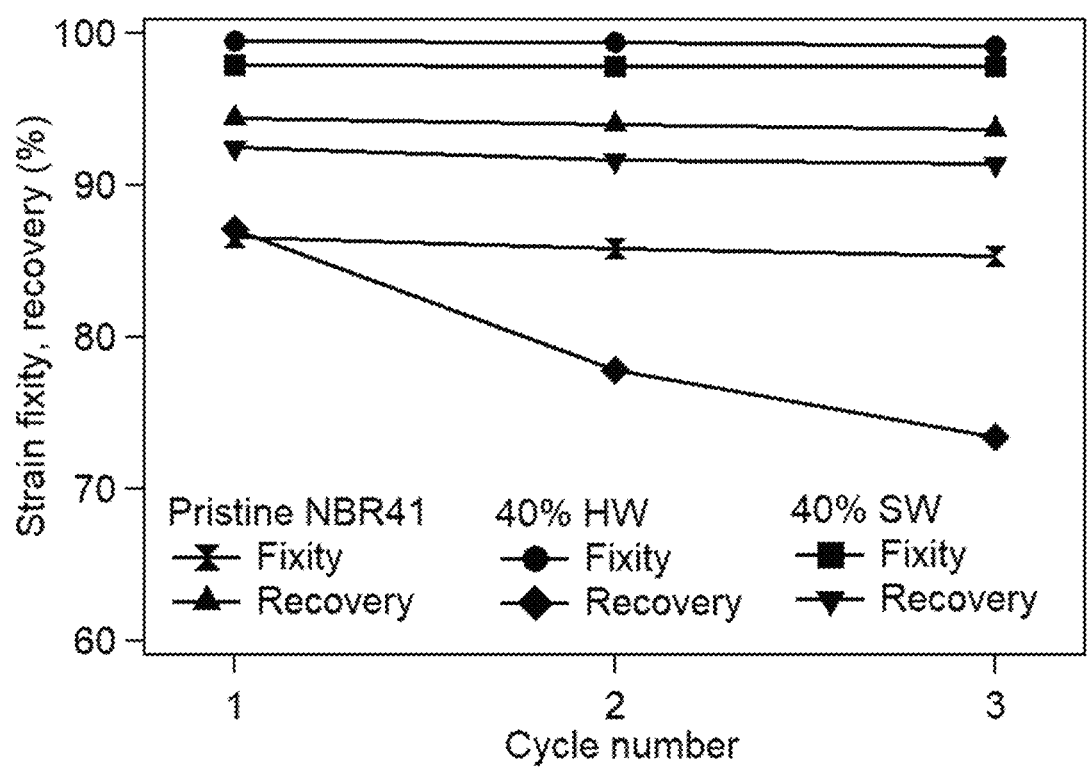
Figure 5D:
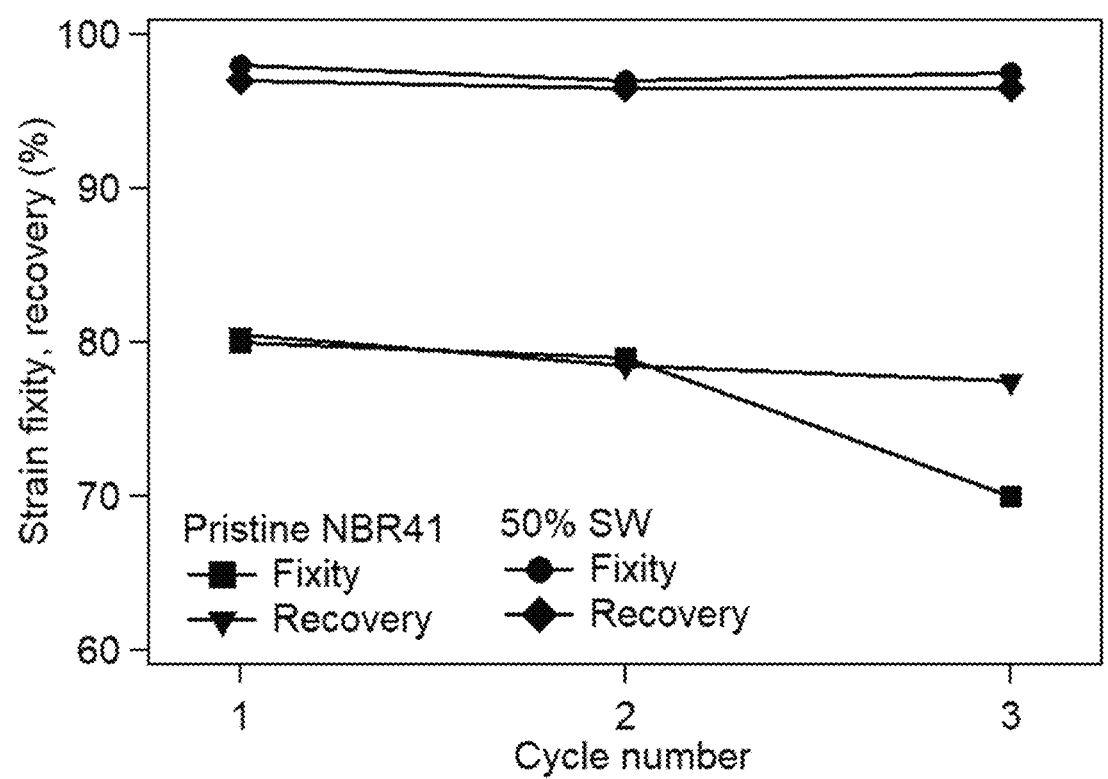
Figure 5E:
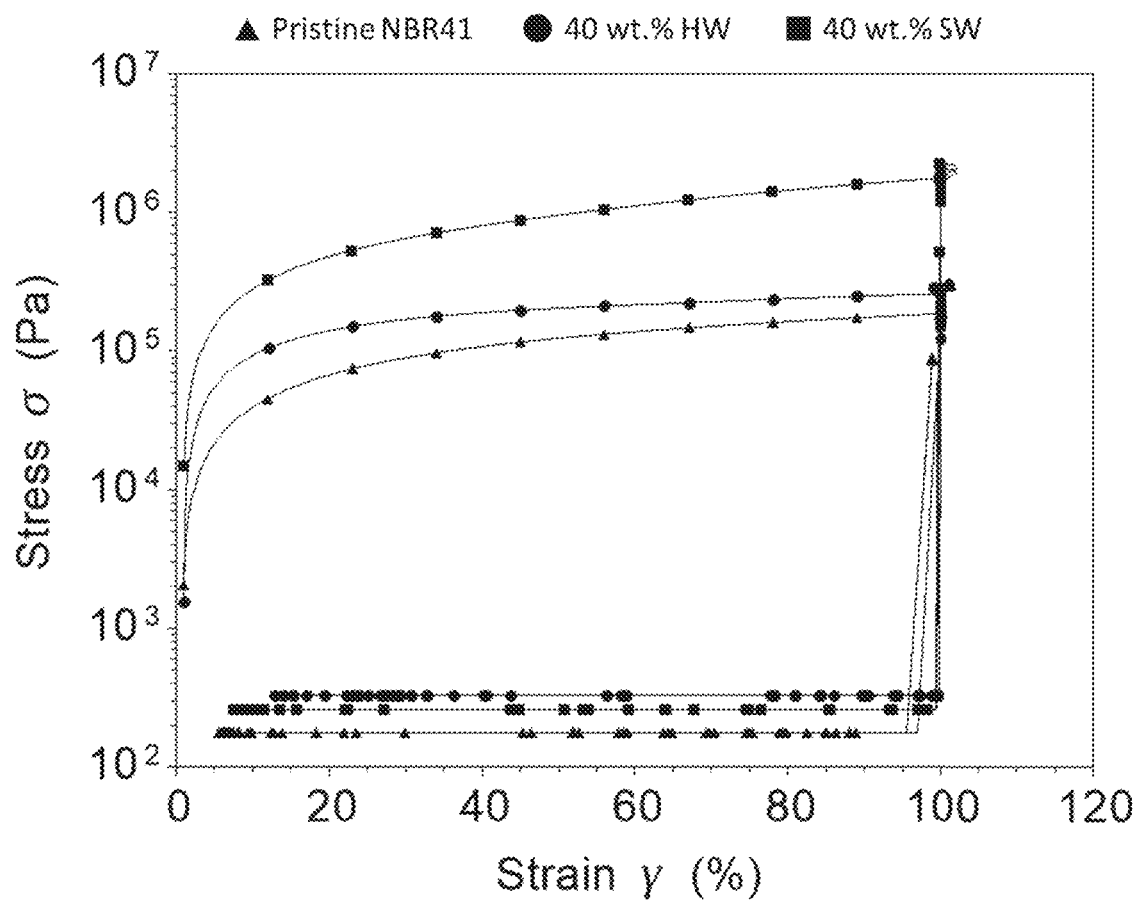
Figure 5F:
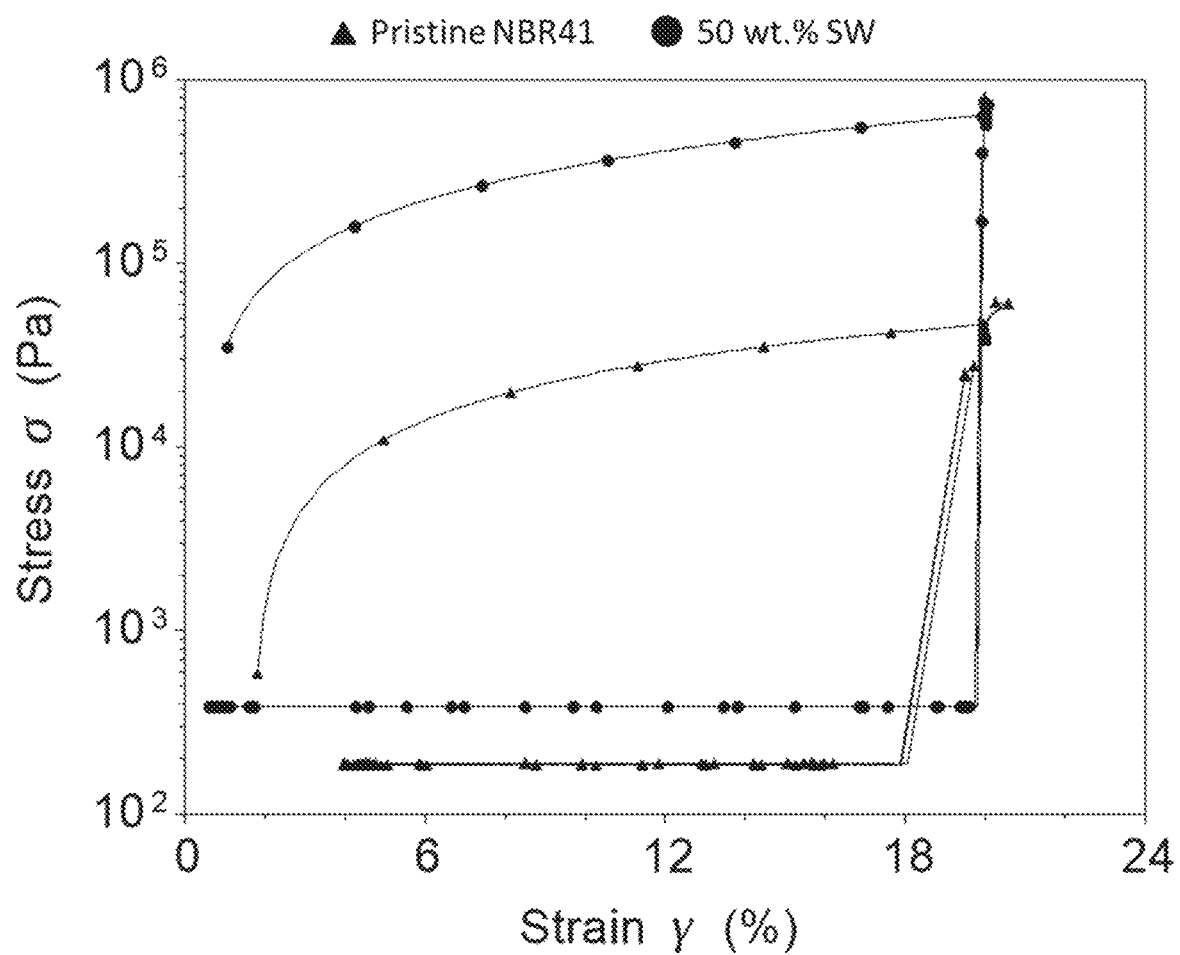

The data presented in FIG. 5C indicates an excellent strain recovery of ABL with 40 wt % SW lignin, approximately 92% strain recovery after very large deformation, 100% strain amplitude at 50° C. (approximately 67° C. above the glass transition temperature of the pristine NBR41), which was a similar characteristic of the pristine NBR41. The measured strain restoration of the samples is consistent with and agrees with the rheological data related to the highly crosslinked and physically networked (hydrogen bonded) structures between pristine NBR41 and SW lignin. Remarkably, the strain fixity of both ABLs with 40 wt % HW lignin and 40 wt % SW lignin stayed at very high values (about 98% to 99%) and remained almost unchanged after three cycles of deformation and recovery, as demonstrated in FIGS. 5A and 5C. In contrast, pristine NBR 41 revealed low strain fixity at −20° C. (approximately 86%). It is herein surmised that the excellent fixity of the ABLs results from considerable improvement of the glass transition temperatures of the composites and the formation of hydrogen-bonded associations. The measured data indicate that pristine NBR41 has poor programmability and that it lacks the ability to control shape for shape-memory applications. However, a representative sample of 50 wt % SW-lignin-based ABL exhibited excellent strain recovery and fixity (about 98%) when programmed at a higher temperature (100° C.); (i.e., about 117° C. above the glass transition temperature of the pristine NBR41) (FIG. 5D). The amount of stress required to achieve the prescribed deformation can be realized from FIGS. 5E and 5F. These figures show stress-strain curves associated with deformation and recovery cycles of these selected samples programmed at 50° C. and 100° C. The stress and modulus of the samples are also recoverable after multiple programmed deformation-fixity-recovery cycles. A substantial increase in required deformation stress of the rubber matrix as a function of incorporated lignin fractions indicates the potential for a wide range of sensor applications relevant to motion and stress detection. At room temperature, depending on the type and amount of lignin used, these leathery materials exhibit 10-30 MPa tensile strength with a broad range of strain to failure (180-400%).

In other experiments, the correlations between the material deformation and the elastic work for shape recovery were further quantified. The specific deformation required a certain stress, and the corresponding work (w) normalized by the sample volume is called the maximum elastic work density, $$\left(\frac{W}{V}\right)_{max}.$$

A selected temperature (−20° C.) was used to study the fixity of the samples, and the related work density was denoted as the stored elastic work density, $$\left(\frac{W}{V}\right)_{stored}.$$

Antnamatten's model (Anthamatten, M. et al., *Macromolecules* 2013, 46 (10), 4230-4234) was used for the ideally elastic neo-Hookean solids under uniaxial stretching to quantify the elastic work density $$\left(\frac{W}{V}\right)$$

of the shape-memory polymers at different programming temperatures.

The maximum and stored elastic work density of different studied samples (including pristine NBR41 and ABLs that contain 40 to 60 wt % HW lignin and SW lignin) under selected programming temperatures and applied strains were computed using appropriately measured stress (σ) at the applied strain (see Table 1 and FIGS. 6A and 6B). The samples were programmed and analyzed at three different conditions: at 50° C. and 50% strain, at 50° C. and 100% strain, and at 100° C. and 20% strain.

TABLE 1

Computed deformation and elastic work density data using Equations 3-8.

| Sample | T (° C.) | $\varepsilon_d$ | $\varepsilon_f$ | $\varepsilon_r$ | $\varepsilon_{cd}$ | $\varepsilon_{cf}$ | σ (Pa) | G (Pa) | (W/V)$_{max}$ (J/m³) | (W/V)$_{stored}$ (J/m³) |
|---|---|---|---|---|---|---|---|---|---|---|
| NBR41 | 50 | 0.5 | 0.412 | 0.028 | 0.459 | 0.374 | 142758 | 98879 | 24708 | 16943 |
| NBR41 | 50 | 1 | 0.866 | 0.055 | 0.896 | 0.769 | 183027 | 59690 | 49208 | 37579 |
| NBR41 | 100 | 0.2 | 0.16 | 0.04 | 0.154 | 0.115 | 45307 | 97499 | 3154 | 1813 |

TABLE 1-continued

Computed deformation and elastic work density data using Equations 3-8.

| Sample | T (° C.) | $\varepsilon_d$ | $\varepsilon_f$ | $\varepsilon_r$ | $\varepsilon_{cd}$ | $\varepsilon_{cf}$ | σ (Pa) | G (Pa) | $(W/V)_{max}$ (J/m³) | $(W/V)_{stored}$ (J/m³) |
|---|---|---|---|---|---|---|---|---|---|---|
| 40 wt % HW | 50 | 0.5 | 0.494 | 0.049 | 0.430 | 0.424 | 187083 | 139056 | 30827 | 30083 |
| 40 wt % HW | 50 | 1 | 0.995 | 0.129 | 0.771 | 0.767 | 257249 | 99955 | 63329 | 62687 |
| 40 wt % HW | 100 | 0.2 | 0.193 | 0.01 | 0.188 | 0.181 | 33346.9 | 58507 | 2778 | 2586 |
| 50 wt % HW | 50 | 0.5 | 0.498 | 0.084 | 0.384 | 0.382 | 184879 | 155082 | 27925 | 27679 |
| 50 wt % HW | 50 | 1 | 0.996 | 0.144 | 0.748 | 0.745 | 168337 | 67758 | 40668 | 40332 |
| 50 wt % HW | 100 | 0.2 | 0.196 | 0.046 | 0.147 | 0.143 | 18204.6 | 40959 | 1218 | 1158 |
| 60 wt % HW | 50 | 0.5 | 0.497 | 0.085 | 0.382 | 0.380 | 342682 | 288467 | 51627 | 50944 |
| 60 wt % HW | 50 | 1 | 0.997 | 0.224 | 0.634 | 0.632 | 371340 | 180445 | 80651 | 80095 |
| 40 wt % SW | 50 | 0.5 | 0.483 | 0.026 | 0.462 | 0.445 | 854361 | 587832 | 148548 | 138998 |
| 40 wt % SW | 50 | 1 | 0.979 | 0.075 | 0.860 | 0.841 | 1723600 | 589501 | 452834 | 434884 |
| 40 wt % SW | 100 | 0.2 | 0.172 | 0.015 | 0.182 | 0.155 | 329158 | 596388 | 26664 | 19492 |
| 50 wt % SW | 50 | 0.5 | 0.494 | 0.076 | 0.394 | 0.388 | 2172940 | 1772313 | 335009 | 326366 |
| 50 wt % SW | 50 | 1 | 0.991 | 0.152 | 0.736 | 0.728 | 4349770 | 1784095 | 1040200 | 1020702 |
| 50 wt % SW | 100 | 0.2 | 0.196 | 0.01 | 0.188 | 0.184 | 636023 | 1115909 | 52983 | 50882 |
| 60 wt % SW | 50 | 0.5 | 0.492 | 0.058 | 0.418 | 0.410 | 5584370 | 4280074 | 900392 | 870818 |
| 60 wt % SW | 50 | 1 | 0.762 | 0.106 | 0.808 | 0.593 | 8806190 | 3241127 | 2229919 | 1285836 |

The corresponding elastic shear modulus (G) of polymers was determined from the true elastic stress (σ) at a corrected deformation or strain ($\varepsilon_{cd}$) as shown in eq. (7).

$$\sigma = G\left[(1+\varepsilon_{cd})^2 - \frac{1}{(1+\varepsilon_{cd})}\right] \quad (3)$$

$$G = nK_BT \quad (4)$$

$$\left(\frac{W}{V}\right)_{max} = G\left[\frac{(1+\varepsilon_{cd})^2}{2} + \frac{1}{(1+\varepsilon_{cd})} - \frac{3}{2}\right] \quad (5)$$

$$\left(\frac{W}{V}\right)_{stored} = G\left[\frac{(1+\varepsilon_{cf})^2}{2} + \frac{1}{(1+\varepsilon_{cf})} - \frac{3}{2}\right] \quad (6)$$

In the above equations, n is the strand or molecular segment density in the networked structure of the material, $K_B$ is the Boltzmann's constant, W is the work and V is sample volume. The first cycles of deformation at selected programming temperatures and strains were investigated. The appropriate work density was computed by using eq. (5) and eq. (6), in which the corrected strain after deformation ($\varepsilon_{cd}$) and corrected fixed strain after unloading ($\varepsilon_{cf}$) were defined by eqs. (7) and (8) involving residual strain ($\varepsilon_r$).

$$\varepsilon_{cd} = \frac{(\varepsilon_d - \varepsilon_r)}{(1+\varepsilon_r)} \quad (7)$$

$$\varepsilon_{cf} = \frac{(\varepsilon_f - \varepsilon_r)}{(1+\varepsilon_r)} \quad (8)$$

FIGS. 6A and 6C show results of stored elastic work density as a function of strain of different investigated samples of NBR41 and NBR41 mixed with different weight percentages (40-60 wt %) of either SW or HW lignin, wherein FIG. 6A is an enlargement of the NBR41 and 40 wt % HW lignin bars in FIG. 6C. FIGS. 6B and 6D show results of maximum elastic work density as a function of strain of the corresponding samples shown in FIGS. 6A and 6C, wherein FIG. 6B is an enlargement of the NBR41 and 40 wt % HW lignin bars in FIG. 6D. The data presented in FIGS. 6A and 6B indicate significant improvement of the maximum elastic work density of an NBR41 matrix when combined with SW lignin. The increase in the elastic stress and elastic work density of ABLs that was required to apply a certain strain, particularly for those of SW-lignin-NBR41 compositions, reveals reinforcement of the rubber matrix by the lignin component. The values determined for elastic stress and the consequent work density are consistent with the improvement of storage modulus at elevated temperatures in the terminal region (FIGS. 3A-3F). In all cases, lignin (both HW and SW) highly contributes to the fixity of the programmed temporary shapes. The measured results shown in the last two columns of Table 1 and the data presented in FIGS. 6A and 6B exhibit similar maximum and stored elastic work density obtained from deforming ABL samples at selected programming temperatures. In contrast, the values of $$\left(\frac{W}{V}\right)_{stored}$$

dramatically dropped for the pristine rubber in all programming cases, which indicates very poor fixity of the rubber, as corroborated with the results discussed earlier. Indeed, the capacity of fixing and recovering the shape of rubber at a high temperature, such as 100° C., was the lowest, as demonstrated by very low maximum and stored elastic work density (3,154 and 1,813 J/m³, respectively). On the other hand, ABL based on SW lignin possesses excellent restoration and fixity characteristics. The $$\left(\frac{W}{V}\right)_{max} \text{ and } \left(\frac{W}{V}\right)_{stored}$$

data of ABLs with 50 wt % SW lignin obtained by programming at 100° C. and 20% strain are nearly 17 times higher than the corresponding results for the pristine NBR41 rubber. Also, the maximum and stored work density values for the same composition are almost identical, which indicates very good fixing characteristics of the material. The measured work density data corroborate the role of cross-linked and hydrogen-bonded associations of ABLs in assisting the repeated shape restoration and fixity under different programming conditions.

Programmable and Switchable Electrical Conducting Characterization

The composite of 40 wt % SW-NBR41 was used as a shape memory substrate to prepare a programmable and switchable electrical conducting material. Silver nanoparticles (99.95% purity, 50- 60 nm) were blade-coated on top of the 40 wt % SW-NBR41 substrate using polystyrene solution as a binder layer. The coating procedure is schematically illustrated in FIG. 7. Polystyrene ($M_w$=192 kD) was dissolved in toluene (40 mg/mL) by ultrasonicating for 30 minutes then stirring at room temperature at 150 rpm for 30 more minutes. The electrical conducting characteristics of a selected sample at different conditions were investigated. The variable resistance of the material was measured during the shape programming. The corresponding resistance of the sample was measured in situ during the shape programming and recovery cycles. The visual heal-ability of the AgNP layer after deforming and programming was demonstrated by SEM analysis collected at different magnifications using a 10 kV accelerating voltage and a working distance of 9.5 mm.

Embedding conductive spherical particles of metals in the bulk polymers requires very high loading of particles, commonly over 16% by volume (roughly 35 to 40 wt %) to reach a percolating threshold (B. C. Tee et al., *Nature Nanotechnology* 2012, 7 (12), 825-32). This enormous metallic content added into the polymer matrix results in significant changes in material properties and cost. In the present experiments, a simpler route was taken to prepare a programmable conducting material based on an ABL composition with 40 wt % SW lignin that exhibits excellent shape memory characteristics. The methodology involves bonding a layer of Ag nanoparticles to the surface of an ABL specimen with polystyrene dissolved in toluene, as illustrated in FIG. 7. The thickness of binder and Ag nanoparticle layers, as measured from SEM images, was 8.6±1.5 μm. The total weight fraction of Ag nanoparticles, about 1.5±0.2 wt %, on the ABL was determined by thermogravimetry.

A preheated (100° C.) device was shape-programmed following the procedure discussed earlier (FIG. 2A). After being fixed, the temporarily shaped specimen was stretched by an external stress at ambient temperature multiple times, and the corresponding resistance data were recorded. An increase in resistance occurred during the application of stress. The initial resistance of the thin film that was programmed into a temporary shape was approximately 0.46 kΩ. However, when stress was applied axially, the resistance gradually increased to 2.86 kΩ.

Prior study of deformation in shape-programmable conductive materials suggests that the changes in resistance induced by changes in applied stress can be utilized for human motion tracking (K.-Y. Chun et al., *Nature Nanotechnology* 2010, 5 (12), 853-857). Interestingly, after the applied stretching force is released, the shape-programmed sample quickly recovers its initial shape within 30 seconds. The measured resistance was restored as well, to about 0.47 kΩ. The process of applying stress (stretching) and recovery at ambient temperature repeatedly produced similar changes in resistance values, indicating very good shape-fixing/programming characteristics. These gentle stretch and associated change in electrical resistance followed by recovery of both shape and resistance value suggest suitability of these leathery materials (with $T_g$ close to or slightly below room temperature) as skin-like material capable to sense change in electrical resistance as function of stretch. Use of low aspect ratio particles (approximately or completely spherical AgNPs) and the breaking of particle percolation and associated change in resistance could be used for detecting even small strain amplitudes (deformation). In addition, the temporarily programmed shape and resistance of the device (about 0.46 kΩ) was quickly restored to its initial shape and initial electrical resistance after being heated on a hotplate at 100° C. The restoration of the object is shown in the time-lapsed photographs in FIG. 8. Thus, these stretchable leathery materials could also demonstrate thermally triggered shape recovery that could also register appropriate change in electrical resistance.

A representative ABL device was attached to a dynamic mechanical analyzer and axially stretched (stress was applied) to 50% strain at 50° C. Then the device was programmed, and the strain recovery corresponding to the electrical resistance change was measured. By stretching the sample to 50% strain, the electrical percolation was lost, as indicated by a jump in resistance of four to six orders of magnitude. As evidenced by the graphs in FIGS. 9A and 9B, its initial electrical resistance was restored after recovery from the strain. The sequential resistance loss and restoration behaved more consistently after the first two cycles. It can be surmised that at least two deformation and thermal cycles are required to reach thermal and structural equilibrium of the conducting nanoparticle layer on the ABL substrate. A deformation-fixing-recovery cycle was also conducted to investigate changes in the percolating network of the Ag nanoparticle layer coated on a shape-memory ABL substrate (40 wt % SW lignin). Scanning electronic microscopy (SEM) was used to observe the topography of the coated surface. FIGS. 9C-9E are scanning electron microscopy images of healed electrically conducting silver nanoparticle layer after stretching and programming: FIG. 9C is an initial state of the electronic skin; FIG. 9D is the deformed and programmed electronic skin (stretching direction denoted by the white arrows); and FIG. 9E is the shape-recovered electronic skin. The SEM images (FIGS. 9C-9E) indicate that the initial structure of the silver nanoparticle layer completely recovers after deformation. The uniform percolated structure of the nanoparticle layer is shown in FIG. 9C. Micrometer-wide cracks (FIG. 9D) were detected, and electrical conductivity was lost in the coating after the device had been stretched. The structure of the silver nanoparticle layer was healed, and its ability to conduct electricity was restored by heating the stretched and temporarily fixed device on the hotplate for several hundreds of seconds, as shown by the SEM image in FIG. 9E. To confirm that the healed structure had regained its ability to conduct electricity, its resistance was measured and compared with the resistance values measured for the specimen before it was stretched.

While there have been shown and described what are at present considered the preferred embodiments of the invention, those skilled in the art may make various changes and modifications which remain within the scope of the invention defined by the appended claims.

What is claimed is:

1. An object comprising a blend of: (i) a phenol-containing polymer; (ii) a nitrile butadiene rubber; and (iii) substantially spherical particles having a zerovalent metal composition, wherein said particles are in admixed form within said blend or said particles are a coating on a surface of said object, wherein said blend defines a shape of said object; wherein said phenol-containing polymer is present in an amount of at least 5 wt % and up to about 95 wt % by total weight of components (i) and (ii).

2. The object of claim 1, wherein said phenol-containing polymer is a lignin.

3. The object of claim 2, wherein said lignin is a softwood lignin.

4. The object of claim 2, wherein said lignin is a hardwood lignin.

5. The object of claim 1, wherein said nitrile butadiene rubber has an acrylonitrile content of 20-55 mol %.

6. The object of claim 1, wherein said phenol-containing polymer is present in an amount of at least 20 wt % and up to about 70 wt % by total weight of components (i) and (ii).

7. The object of claim 1, wherein said phenol-containing polymer is present in an amount of at least 40 wt % and up to about 60 wt % by total weight of components (i) and (ii).

8. The object of claim 1, wherein said substantially spherical particles having a zerovalent metal composition reside on a surface of said blend that defines a shape of said object, without being within said blend.

9. The object of claim 1, wherein said substantially spherical particles having a zerovalent metal composition are within said blend.

10. The object of claim 1, wherein said substantially spherical particles having a zerovalent metal composition are present in an amount of up to 30 wt % by weight of components (i), (ii), and (iii).

11. The object of claim 1, wherein said zerovalent metal composition is selected from the group consisting of silver (Ag), gold (Au), cobalt (Co), rhodium (Rh), iridium (Jr), nickel (Ni), palladium (Pd), platinum (Pt), copper (Cu), cadmium (Cd), aluminum (Al), tin (Sn), and combinations thereof.

12. The object of claim 1, wherein said particles have a size of 1-200 nm.

\* \* \* \* \*